(12) United States Patent
Kanki

(10) Patent No.: US 10,664,220 B2
(45) Date of Patent: May 26, 2020

(54) DISPLAY CONTROL DEVICE, DISPLAY SYSTEM, AND DISPLAY CONTROL METHOD

(71) Applicant: SHARP KABUSHIKI KAISHA, Sakai, Osaka (JP)

(72) Inventor: Noriyoshi Kanki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/080,460

(22) PCT Filed: Feb. 17, 2017

(86) PCT No.: PCT/JP2017/005965
§ 371 (c)(1),
(2) Date: Aug. 28, 2018

(87) PCT Pub. No.: WO2017/150223
PCT Pub. Date: Sep. 8, 2017

(65) Prior Publication Data
US 2019/0065134 A1 Feb. 28, 2019

(30) Foreign Application Priority Data
Feb. 29, 2016 (JP) .................. 2016-037560

(51) Int. Cl.
*G06F 3/14* (2006.01)
*G06F 3/0488* (2013.01)
(Continued)

(52) U.S. Cl.
CPC .............. *G06F 3/1446* (2013.01); *G06F 3/14* (2013.01); *G06F 3/1423* (2013.01);
(Continued)

(58) Field of Classification Search
CPC .... G06F 3/1423; G06F 3/1446; G06F 3/0488; G06F 3/04883; G09B 5/08–125;
(Continued)

(56) References Cited

U.S. PATENT DOCUMENTS 9,635,091 B1 * 4/2017 Laukkanen ........... H04L 67/025
10,389,765 B2 * 8/2019 Zeng ..................... G06F 3/0481
(Continued)

FOREIGN PATENT DOCUMENTS

JP H11-191036 7/1999
JP 2010-033375 A 2/2010
(Continued)

*Primary Examiner* — Xuemei Zheng
(74) *Attorney, Agent, or Firm* — ScienBiziP, P.C.

(57) ABSTRACT

A display system includes multiple display devices (11, 12) and a control device (30) connected to the multiple display devices (11, 12). The control device (30) includes a device selecting unit (131) that causes a user to select at least one display device (11) out of the multiple display devices (11, 12), and a display control unit (132) that displays image data on the selected display device (11). Accordingly, a display system can be provided where, when displaying image data on multiple display devices, display can be made at a position intended by the user, to facilitate viewing of the image data.

9 Claims, 19 Drawing Sheets

(51) Int. Cl.
*G09G 5/14* (2006.01)
*G09G 5/10* (2006.01)
*G09G 5/38* (2006.01)
*G09G 5/00* (2006.01)
*G08B 5/38* (2006.01)

(52) U.S. Cl.
CPC .............. *G06F 3/1454* (2013.01); *G09G 5/00* (2013.01); *G09G 5/10* (2013.01); *G09G 5/38* (2013.01); *G06F 3/0488* (2013.01); *G08B 5/38* (2013.01); *G09G 2370/042* (2013.01)

(58) Field of Classification Search
CPC ........... H04N 21/2187; H04N 21/4788; H04N 21/41407; H04N 21/431; H04N 21/6181; H04L 51/24; G09G 2370/042
See application file for complete search history.

(56) References Cited

U.S. PATENT DOCUMENTS

| | | | |
|---|---|---|---|
| 2008/0026790 A1* | 1/2008 | Nakao | H04H 60/32 455/556.1 |
| 2011/0096014 A1* | 4/2011 | Fuyuno | G06F 1/1616 345/173 |
| 2014/0089416 A1 | 3/2014 | Wang | |
| 2017/0228550 A1* | 8/2017 | Harb | H04N 21/436 |

FOREIGN PATENT DOCUMENTS

| | | | |
|---|---|---|---|
| JP | 4799013 B2 | 10/2011 | |
| JP | 5777915 B2 | 9/2015 | |

\* cited by examiner

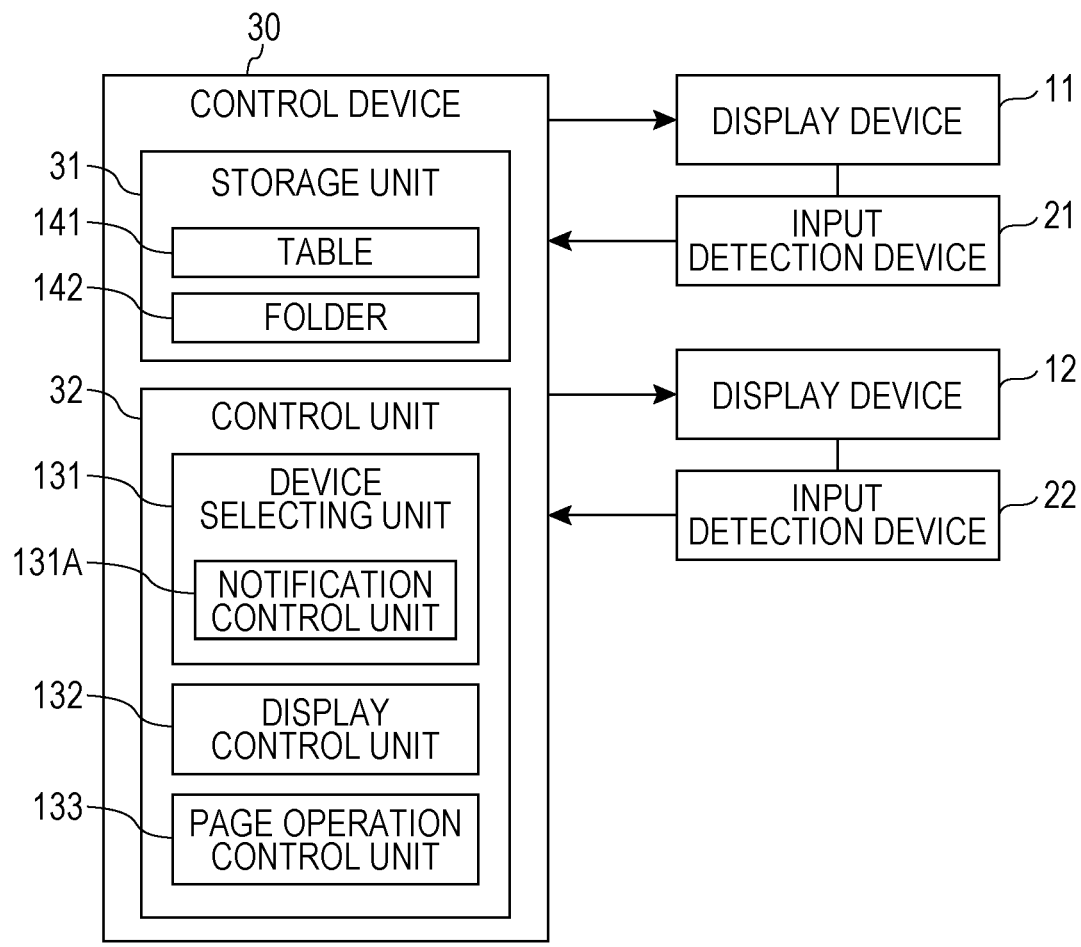

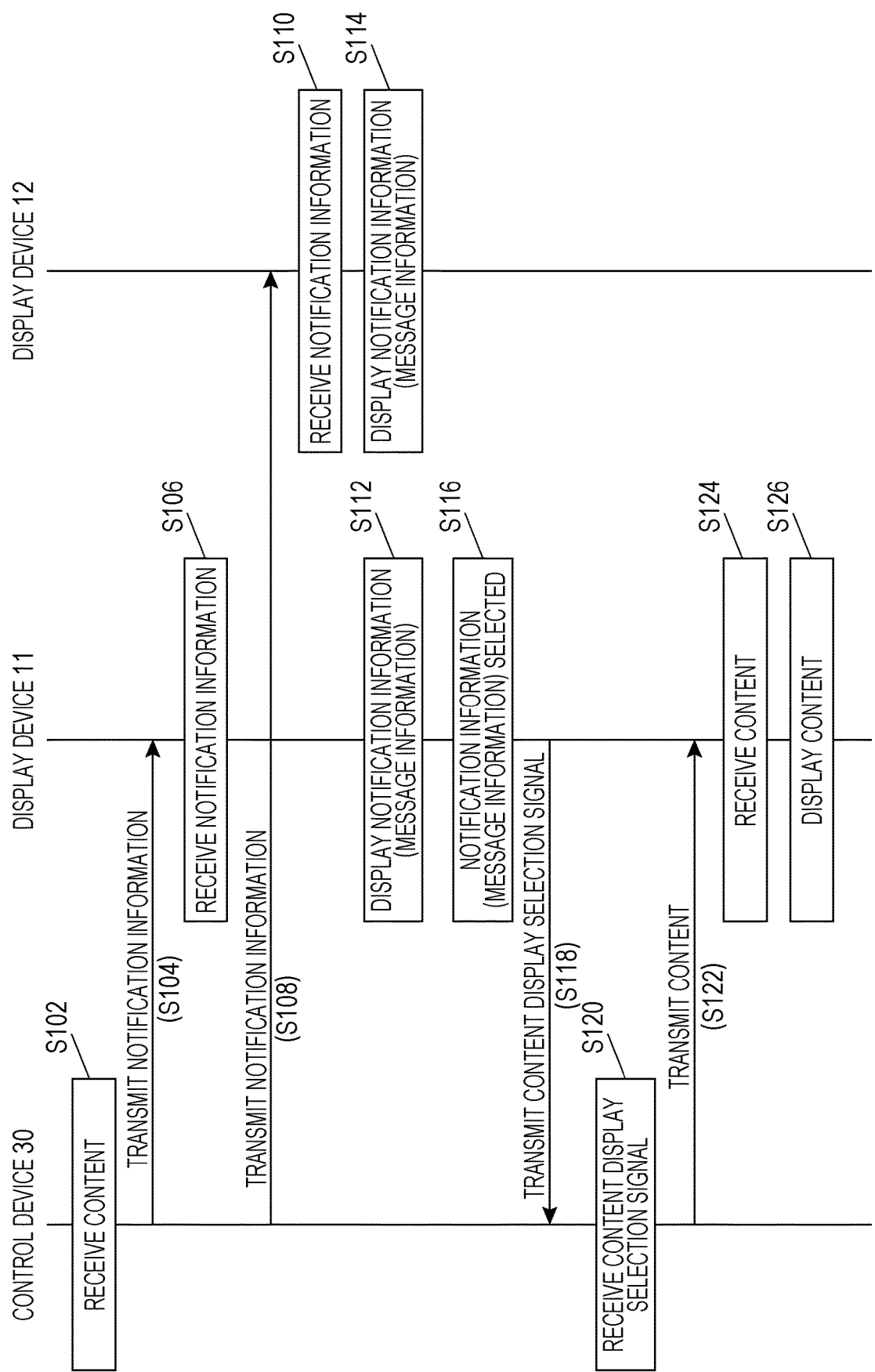

DISPLAY CONTROL DEVICE, DISPLAY SYSTEM, AND DISPLAY CONTROL METHOD

TECHNICAL FIELD

The present invention relates to a display system that displays image data on multiple display devices, and so forth. The present application claims the benefit of Japanese Patent Application No. 2016-37560 filed Feb. 29, 2016, which is hereby incorporated by reference herein in its entirety.

BACKGROUND ART

There have been developed multi-display devices where multiple display devices are arrayed. In a multi-display device, multiple display devices can be configured as a single screen, and a content such as image data and so forth can be displayed on the single screen.

For example, in a case where two display devices are arrayed side-by-side as a multi-display, a user (teacher, presenter, etc.) can display image data on the multi-display and give classes or lectures to an audience (students, participants, etc.).

However, a multi-display device is configured where two display devices are a single screen, so when displaying image data, the image data is displayed across two display devices.

Now PTL 1 discloses technology where, when image data is displayed across two display devices, the image data is automatically moved to one display device of the two display devices.

Also, PTL 2 discloses a technology where, when image data is displayed across two display devices, the image data is moved to one display device of the two display devices by a swipe operation (sliding operation) by the user. Technology for moving image data by sliding operations is also disclosed in PTL 3.

CITATION LIST

Patent Literature

PTL 1: Japanese Patent No. 4,799,013
PTL 2: Japanese Patent No. 5,777,915
PTL 3: Japanese Unexamined Patent Application Publication No. 11-191036

SUMMARY OF INVENTION

Technical Problem

However, with the technology disclosed in PTL 1 and 2, the image data is first display across two display devices. It is preferable that the image data be displayed readily viewable from the user (teacher, presenter, etc.) and audience (students, participants, etc.) from the beginning.

Also, the technology disclosed in PTL 1 automatically moves the image data to one display device of the two display devices, to make the image data more readily viewable to the user. For the convenience of giving a class or lecture to the audience, the user would want the image data to be displayed at an intended position, rather than have the image data move automatically (e.g., without permission).

Also, in the technology disclosed in PTL 2, the user him/herself moves the image data to one display device of the two display devices, to make the image data more readily viewable to the user. The user him/herself moving the image data to one display device of the two display devices disadvantageously affects progress of the class or lecture.

The present invention has been made in light of the above-described conventional problems, and accordingly it is an object thereof to provide a display decontrol device and so forth that enables display to be made at a position that the user intends, when displaying a content on multiple display devices.

Solution to Problem

A display control device according to the present invention is a display control device capable of communication with a plurality of display devices capable of displaying a content, the display control device including:
a notification information display control unit that, upon input or reception of the content, performs control of displaying notification information making notification to that effect on the display devices;
a content display selection signal reception unit that receives a content display selection signal from the display devices; and
a content display control unit that, in a case of having received the content display selection signal, effects control to display the content on the display device that has transmitted the content display selection signal.

A display system according to the present invention is a display system including: a plurality of display devices capable of displaying a content; and a display control device capable of communication with the display devices,
wherein the display control device includes
a notification information transmission unit that, upon input or reception of the content, transmits notification information used at the display devices to make notification to that effect, to the display devices,
wherein each of the display devices includes
a notification information display unit that displays notification information received from the display control device, and
a content display selection signal transmission unit that, in a case of a user having selected the displayed notification information, transmits a content display selection signal to the display control device,
and wherein the display control device includes
a content transmission unit that, in a case of having received the content display selection signal, transmits the content to the display device that is the transmission source of the content display selection signal.

A display control method according to the present invention is a display control method in a display control device capable of communication with a plurality of display devices capable of displaying a content, the method including:
a notification information display control step where, upon input or reception of the content, control is effected to display notification information making notification to that effect on the display devices;
a content display selection signal reception step of receiving a content display selection signal from the display devices; and
a content display control step where, in a case of having received the content display selection signal, control is effected to display the content on the display device that has transmitted the content display selection signal.

Advantageous Effects of Invention

According to the present invention, when displaying a content on multiple display devices, the content can be displayed at a position intended by a user.

BRIEF DESCRIPTION OF DRAWINGS

FIG. 1 is a block diagram illustrating the configuration of a display system according to a first embodiment.

FIG. 2 is a diagram illustrating a table of a control device of the display system according to the first embodiment.

FIG. 47 is a sequence diagram for describing the flow of operations in the present specification.

DESCRIPTION OF EMBODIMENTS

Figure 3:
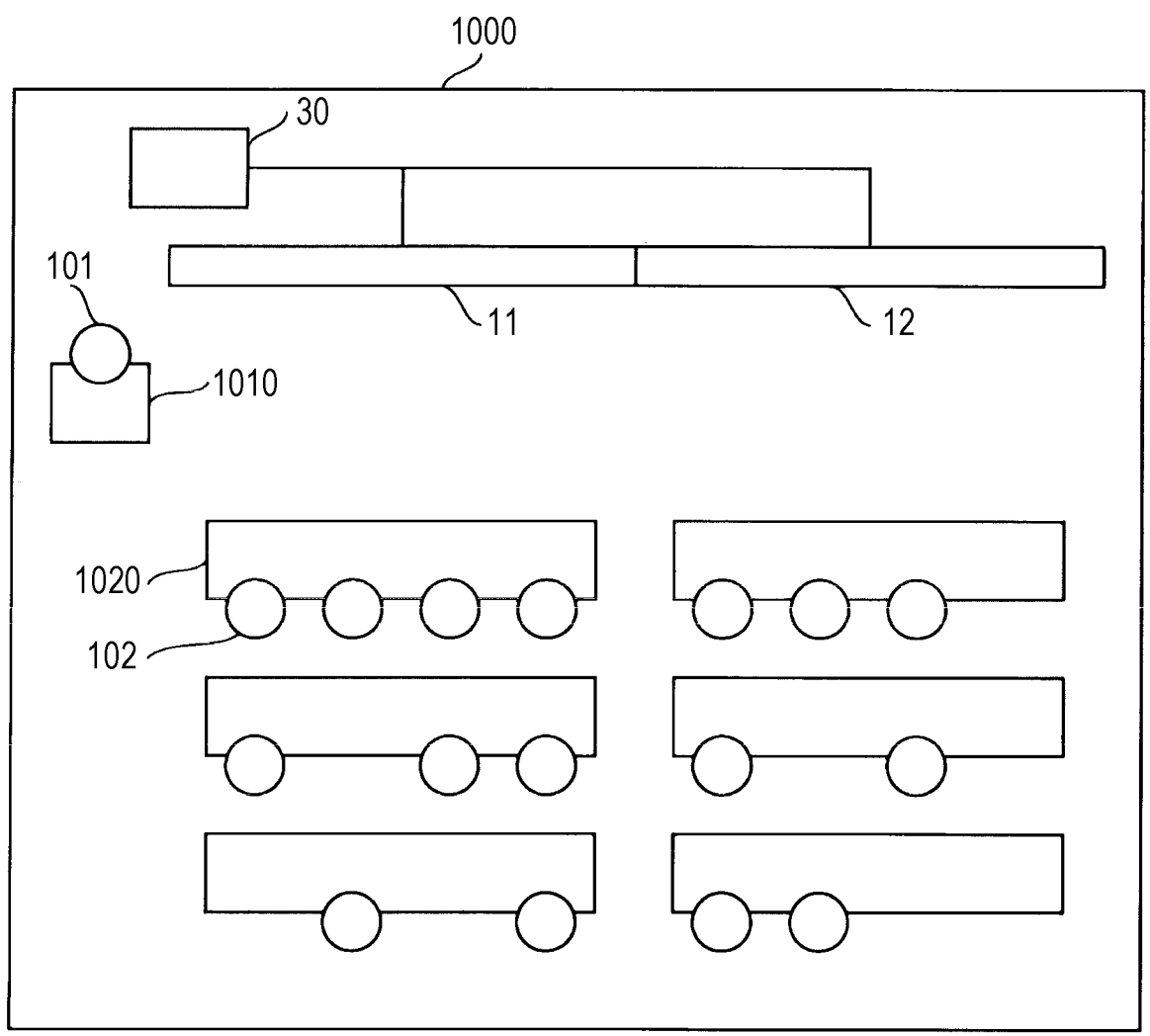
FIG. 3 is a diagram illustrating the layout of multiple display devices in the configuration of the display system according to the first embodiment.

Embodiments of the present invention will be described with reference to the drawings.

First Embodiment

FIG. 1 is a block diagram illustrating the configuration of display system according to a first embodiment. As illustrated in FIG. 1, the display system according to the first embodiment includes multiple display devices, multiple input detection devices, and a control device 30.

The multiple display devices are LCDs (Liquid Crystal Display) omitted from illustration. In the present embodiment, the multiple display devices are, for example, two display devices 11 and 12. Although the display devices are described as being LCDs in the present embodiment, these may be display devices such as OELDs (Organic Electro Luminescence Display), light-emitting displays, or the like.

The multiple input detection devices are touch panels. In the present embodiment, the multiple input detection devices are input detection devices 21 and 22. The user (teacher, presenter, etc.) may, when describing something to an audience (students, participants, etc.), want to reflect input information as to image data displayed on a display device, as supplementary description. In this case, the multiple display devices 11 and 12 are preferably used so as to configure a touch panel display. This is realized by the multiple input detection devices 21 and 22.

The multiple input detection devices 21 and 22 are respectively provided to the multiple display devices 11 and 12. That is to say, the multiple display devices 11 and 12 are each used as touch panel displays, by their own LCDs, and the multiple input detection devices 21 and 22 (touch panels). The multiple input detection devices 21 and 22 each detect user input to the multiple display devices 11 and 12 when the user inputs text or the like by a fingertip or pen tip as to the multiple display devices 11 and 12.

Examples of the multiple input detection devices 21 and 22 include capacitance sensors and optical sensors. Capacitance sensors are arrayed in a matrix form on the LCDs of the multiple input detection devices 21 and 22, for example, and detect a pointing medium (pen tip or fingertip of the user) coming into proximity within a predetermined distance from the LCDs. Optical sensors are distributed in a matrix form by being built into the pixels of the LCDs of the multiple display devices 11 and 12, and detect a pointing medium (pen tip or fingertip of the user) coming into contact with the LCDs.

A projector may also be used as a display device, and configure a system using a motion detector or the like as an input detection device.

The control device 30 is connected to the multiple display devices 11 and 12 and multiple input detection devices 21 and 22. Now, the control device 30 may be a device such as a computer or mobile terminal or the like, for example, or may be a control device built into a display device. Also, with regard to a general-purpose computer or the like, a program that executes later-described processing may be installed in an information processing device such as a computer, table, smartphone, digital camera, electronic dictionary, or the like, and be executed, thereby operating as the control device.

The control device 30 has a storage unit 31 and a control unit 32. The control unit 32 is a CPU (Central Processing Unit), and controls the multiple display devices 11 and 12 and multiple input detection devices 21 and 22. A computer program is stored in the storage unit 31, and the control unit 32 executes that computer program.

The storage unit 31 has a table 141. FIG. 2 is a diagram illustrating the table 141 of the control device 30 of the display system according to the first embodiment. The table 141 stores multiple display device identification information ID11 and ID12, for identifying the multiple display devices 11 and 12, respectively, as illustrated in FIG. 2. The table 141 also stores layout information indicating the layout (arrangement) of the multiple display devices 11 and 12.

FIG. 3 is a diagram illustrating the layout of the multiple display devices 11 and 12 in the configuration of the display system according to the first embodiment. The multiple display devices 11 and 12 are arrayed in one row in the sideways direction, near a first wall of a room (classroom) 1000, as illustrated in FIG. 3. Specifically, the multiple display devices 11 and 12 are arrayed in that order from the left to the right. In this case, as illustrated in FIG. 2, the table 141 stores "1" as layout information indicating the first from the left as to the display device identification information ID11 identifying the display device 11, and stores "2" as layout information indicating the second from the left as to the display device identification information ID12 identifying the display device 12.

Also, a desk 1010 and chair (omitted from illustration) are disposed near an end portion of both ends of the one display device 11 where a display device is not provided, for example, as illustrated in FIG. 3. The desk 1010 and chair (omitted from illustration) are used by a user 101 (teacher, presenter, etc.). Desks 1020 and chairs (omitted from illustration) are disposed between the multiple display devices 11 and 12 and a second wall facing the first wall of the room 1000, from a first row to a last row. The desks 1020 and chairs (omitted from illustration) are used by several audience members 102 (students, participants, etc.) per row.

The storage unit 31 further has a folder 142, as illustrated in FIG. 1. When receiving image data from another device, the control unit 32 stores the image data thereof in the folder 142. Alternatively, the display system according to the first embodiment is a multi-function printer realizing functions such as copy, facsimile, and so forth, and when image data is input (scanned) the control unit 32 stores the image data in the folder 142.

The control unit 32 has a device selecting unit 131, a display control unit 132, and a page operation control unit 133, as illustrated in FIG. 1.

The device selecting unit 131 causes the user 101 to select one display device from the multiple display devices 11 and 12. The device selecting unit 131 has a notification control unit 131A, and at the time of input or receiving image data (when image data that has been input or received is saved in the folder 142), the notification control unit 131A notifies the user 101 to that effect by the multiple display devices 11 and 12. The device selecting unit 131 selects the display device that the user 101 has touched out of the multiple display devices 11 and 12.

An example will be described regarding specific operations. A content reception signal (e.g., notification information) to make notification to that effect, i.e., that a content has been input or received, is transmitted to the display devices from the notification control unit 131A of the device selecting unit 131. When the user touches a display device to be selected, selection by the user is detects by the input detection device, and a content selection signal is transmitted to the control device 30. Upon the device selecting unit 131 receiving the content selection signal, the display device that has transmitted the content selection signal is selected at the control device 30.

The display control unit 132 displays the image data saved in the folder 142 on the display device selected by the user 101.

The page operation control unit 133 performs a page operation (page forward or page back) by the user 101 touching image data displayed on the display device.

Next, basic operations (single-page image display processing) and extended operations (multiple-page image display processing) will be described as operations (display processing) of the display system according to the first embodiment.

(Basic Operations (Single-Page Image Display Processing))

Figure 4:
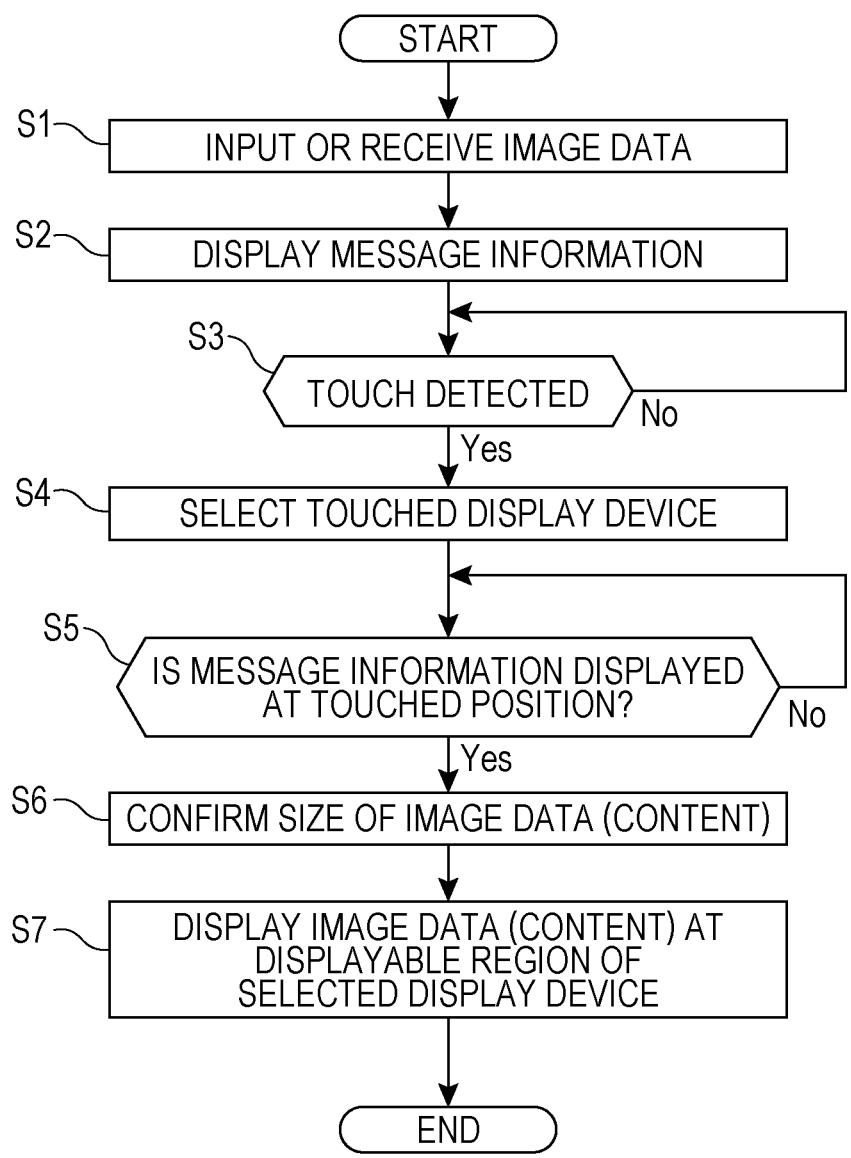
FIG. 4 is a flowchart illustrating operations (display processing) of the display system according to the first embodiment.

FIG. 4 is a flowchart illustrating operations (display processing) of the display system according to the first embodiment. FIGS. 5 through 8 are diagrams for describing basic operations (single-page image display processing) as operations (display processing) of the display system according to the first embodiment.

Figure 5:
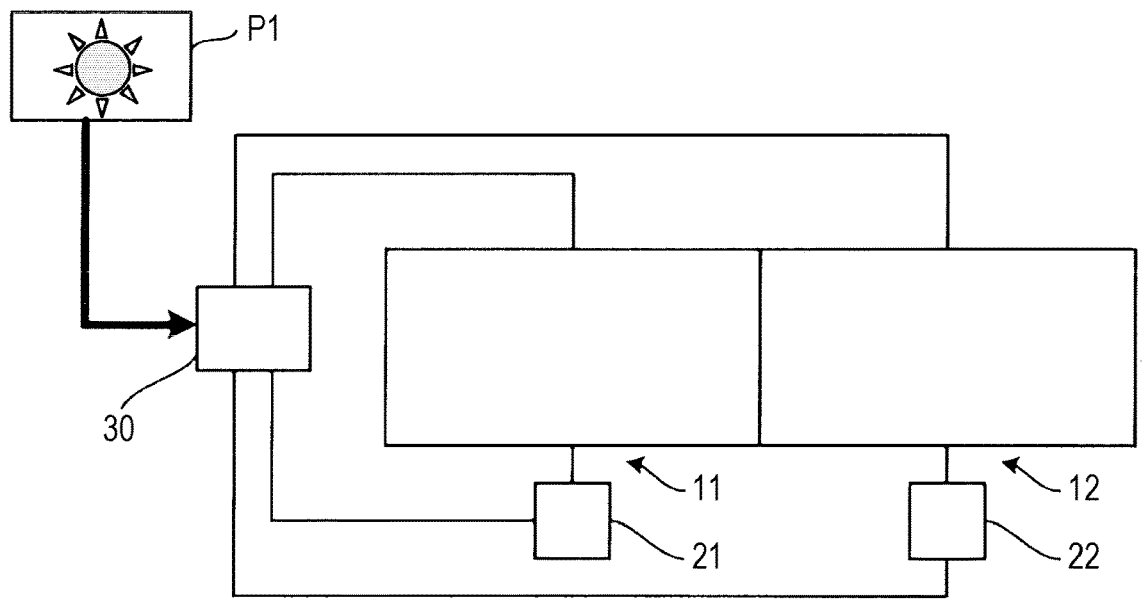
FIG. 5 is a diagram for describing basic operations (single-page image display processing) as operations (display processing) of the display system according to the first embodiment.
Figure 6:
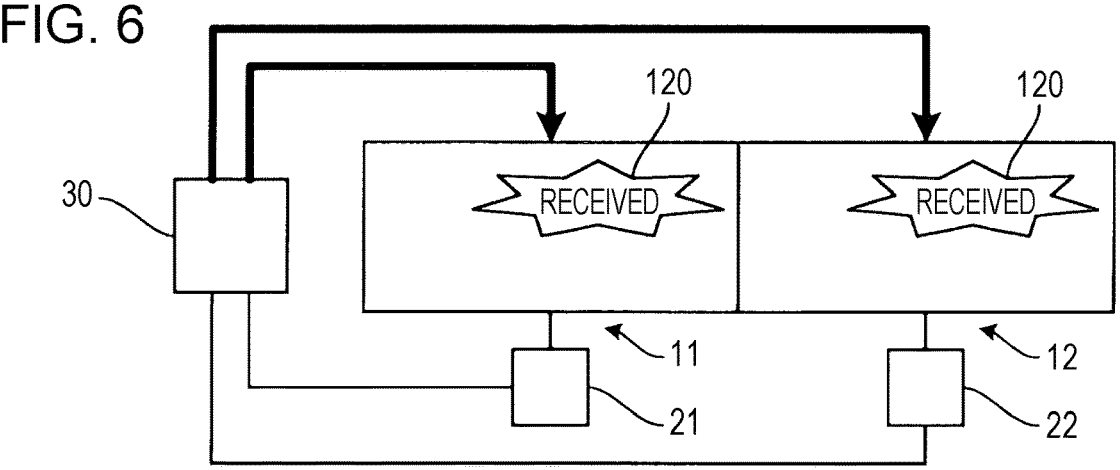
FIG. 6 is a diagram for describing basic operations (single-page image display processing) as operations (display processing) of the display system according to the first embodiment.

The control unit 32 (FIG. 1) of the control device 30 inputs or receives (step S1 in FIG. 4) image data P1 (content), as illustrated in FIG. 5. At this time, the control unit 32 (FIG. 1) saves the image data P1 in the folder 142 (FIG. 1). The notification control unit 131A (FIG. 1) notifies notification information to the effect that the image data P1 has been input or received to the user 101 (FIG. 3), by displaying on the multiple display devices 11 and 12. The notification information is message information 120 for notifying that there has been input or reception of image data, for example, by a message, as illustrated in FIG. 6. Specifically, in a case where image data (content) has been received, a message "received" is displayed on the multiple display devices 11 and 12 based on the message information 120 (step S2 in FIG. 4).

Now, various methods are conceivable regarding a method of displaying message information from the control device 30 on the display devices (display devices 11 and 12). For example, a content reception signal is transmitted from the control device 30 to the display devices. The display devices display the message information 120 upon receiving the content reception signal.

Now, a content reception signal may include or may not include details of the message information 120 serving as the notification information. For example, in a case where the details of the message information 120 are included in the content reception signal, the display devices display the message information 120 based on the content reception signal.

Also, in a case where the content reception signal is simply a notification signal, and the message information 120 is stored in the display devices, the message information 120 can be displayed by receiving the content reception signal.

Now, in a case where the user 101 (FIG. 3) does not touch either of the multiple display devices 11 and 12 (No in step S3 in FIG. 4), the message information 120 continues to be displayed on the multiple display devices 11 and 12.

Figure 7:
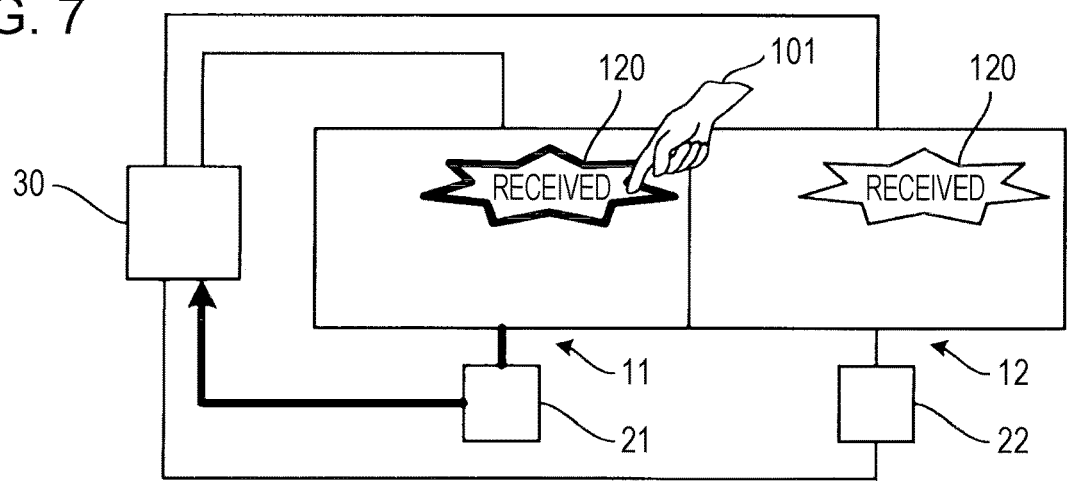
FIG. 7 is a diagram for describing basic operations (single-page image display processing) as operations (display processing) of the display system according to the first embodiment.

On the other hand, in a case where the user 101 has touched the display device 11 out of the multiple display devices 11 and 12 (Yes in step S3 in FIG. 4), the input detection device 21 out of the multiple input detection devices 21 and 22 detects the user touching the display device 11, as illustrated in FIG. 7. The device selecting unit 131 (FIG. 1) of the control device 30 selects, out of the multiple display devices 11 and 12, the display device 11 that the user 101 has touched (step S4).

Now, in a case where there is no message information 120 at the position touched by the user 101 on the selected display device 11 (No in step S5 in FIG. 4), the input detection device 21 detects the input of the user 101 touching the selected display device 11, and generates input information that is omitted from illustration. The input information represents text, shapes, or the like input (drawn) by the user 101. The display control unit 132 (FIG. 1) of the control device 30 displays input information at the position touched by the user 101 on the selected display device 11.

Figure 8:
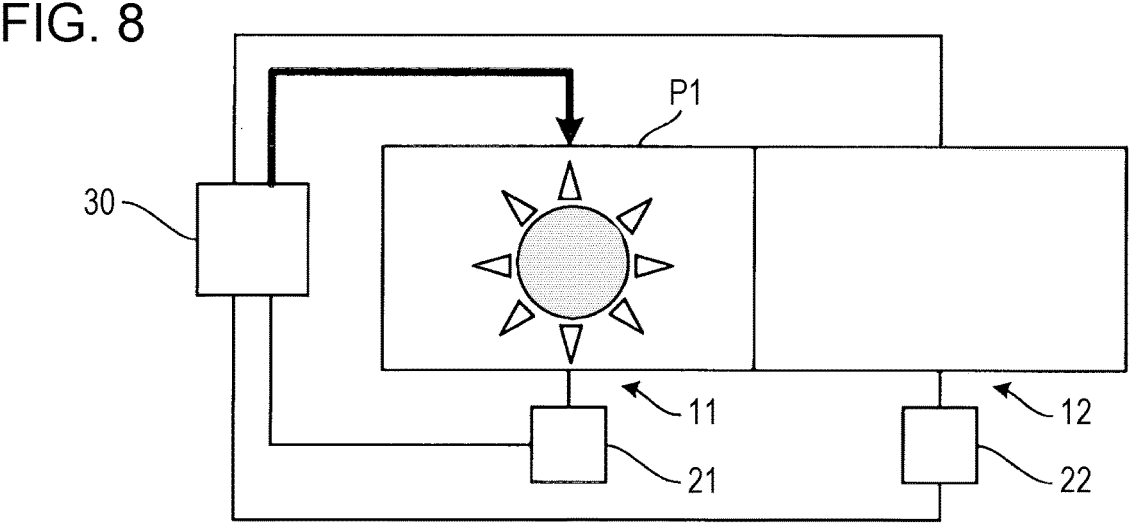
FIG. 8 is a diagram for describing basic operations (single-page image display processing) as operations (display processing) of the display system according to the first embodiment.

On the other hand, in a case where there is message information 120 displayed (existing) at the position touched by the user 101 on the selected display device 11 (Yes in step S5 in FIG. 4), the display control unit 132 (FIG. 1) of the control device 30 confirms the size of the image data P1 as confirmation of the image data P1 (content) (step S6 in FIG. 4). The display control unit 132 (FIG. 1) displays the image data P1 that is the content, in a displayable region of the selected display device 11 (step S7 in FIG. 4), as illustrated in FIG. 8.

Note that the above-described "content" has been described by way of an example of being "image data" in the present embodiment, this may be other data, such as a text message made up of a text string of characters, numerals, symbols, and so forth, for example, or may be moving image data. That is to say, anything will suffice as long as a type of content that can be displayed on a display device.

Although the behavior of the control device 30 and display device 11 (12) has been made clear by the description above, but description will be made in further detail with reference to FIG. 47, to clarify the behavior of the overall system.

That is to say, first, the content is received at the control device 30 (S102). The control device 30 transmits notification information to display devices that are capable of communicating with the control device 30, to notify that the content is received. In FIG. 4, the notification information is transmitted to the display device 11 (S104) and display device 12 (S108). The notification information may include information for identifying the notification information (notification identification information) and may include information for identifying the content (content identification information).

The display devices receive the notification information, and display the notification information. In a case where message information is included, for example, the message information is displayed in the present embodiment. In FIG. 47, the display device 11 receives the notification information (S106), and displays the notification information (message information) (S112). The display device 12 also receives the notification information (S110), and displays the notification information (message information) (S114).

Now, selecting notification information (message information) on a display device causes a content display selection signal to be transmitted to the control device 30. In FIG. 4, notification information (message information) displayed on the display device 11 is selected by the user (S116) as one example, and this selection transmits a content display selection signal to the control device 30 (S118). Note that the content display selection signal may include information for identifying the display device 11 (display device identification information), and may include information for identifying the notification information that has been received and selected (notification identification information).

Now, the display device identification information may be an identification ID unique to the display device, for example, or may be information whereby the display device requesting the content can be identified, such as device name, IP address, MAC address, or the like.

Upon receiving the content display selection signal (S120), the control device 30 transmits the content to the display device that is the transmission source of the content display selection signal (S122). The transmission source is the display device 11 in the present embodiment, so transmission is made to the display device 11.

Note that as for the method of identifying the display device to send the content to, identification may be made based on display device identification information included in the content display selection signal, for example, or may be identified based on the address of the destination.

The display device 11 receives the content (S124), and displays the received content (S126).

Note that in the present embodiment, the content is transmitted to one display device. That is to say, in a case where the content display selection signal is transmitted from the display device 12, the control device 30 transmits the content to the display device from which the content display selection signal has been received first.

Thus, the communication flow between the control device 30 and the display devices described above is exemplary, and any processing will suffice as long as details described in FIG. 4 can be realized. That is to say, only an example of the details disclosed in FIG. 4 has been described, and it is sufficient if the processing of FIG. 4 can be realized.

(Extended Operations (Multiple-Page Image Display Processing))

FIGS. 9 through 14 are diagrams for describing extended operations (multiple-page image display processing) as operations (display processing) of the display system according to the first embodiment.

Figure 9:
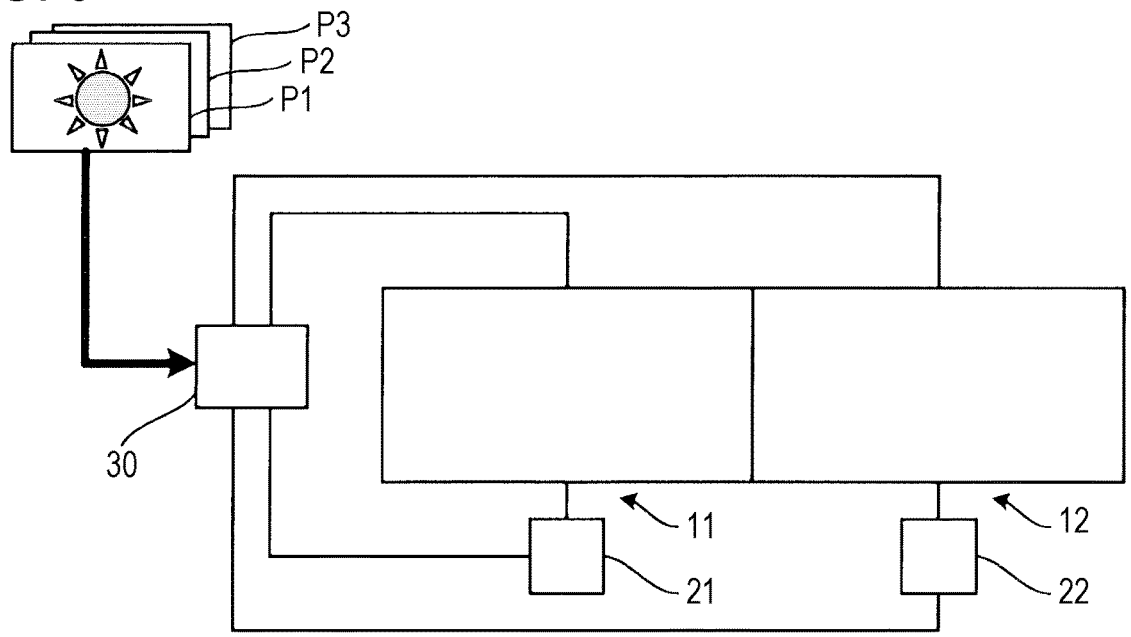
FIG. 9 is a diagram for describing extended operations (multiple-page image display processing) as operations (display processing) of the display system according to the first embodiment.
Figure 10:
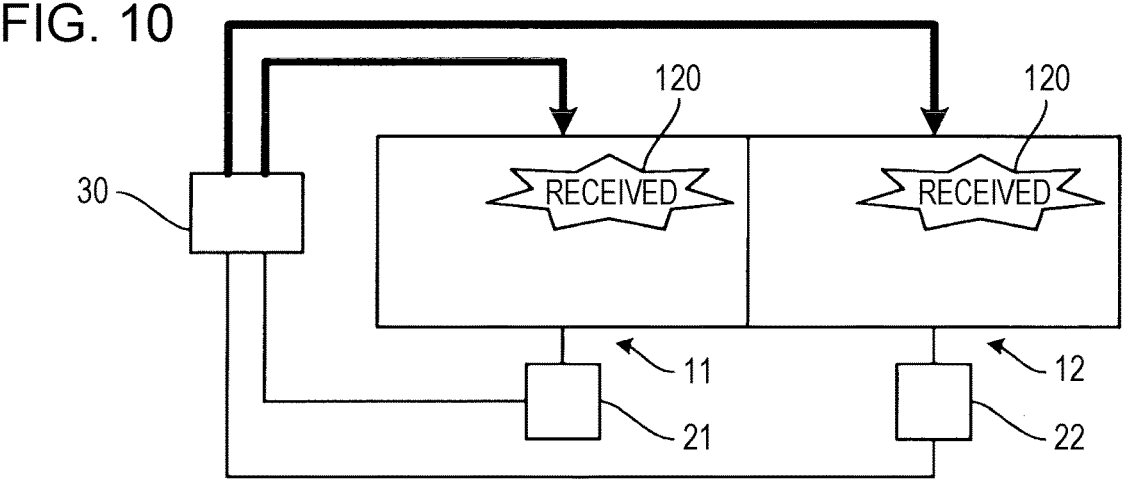
FIG. 10 is a diagram for describing extended operations (multiple-page image display processing) as operations (display processing) of the display system according to the first embodiment.

The control unit 32 (FIG. 1) of the control device 30 inputs or receives (step S1 in FIG. 4) multiple-page image data P1 through P3 (content) from the first page through the third page, as illustrated in FIG. 9. At this time, the control unit 32 (FIG. 1) saves the multiple-page image data P1 through P3 in the folder 142 (FIG. 1). The notification control unit 131A (FIG. 1) displays notification information (message information 120) to the effect that the multiple-page image data P1 through P3 has been input or received to the user 101 (FIG. 3), by displaying on the multiple display devices 11 and 12 (step S2 in FIG. 4), as illustrated in FIG. 10.

Figure 11:
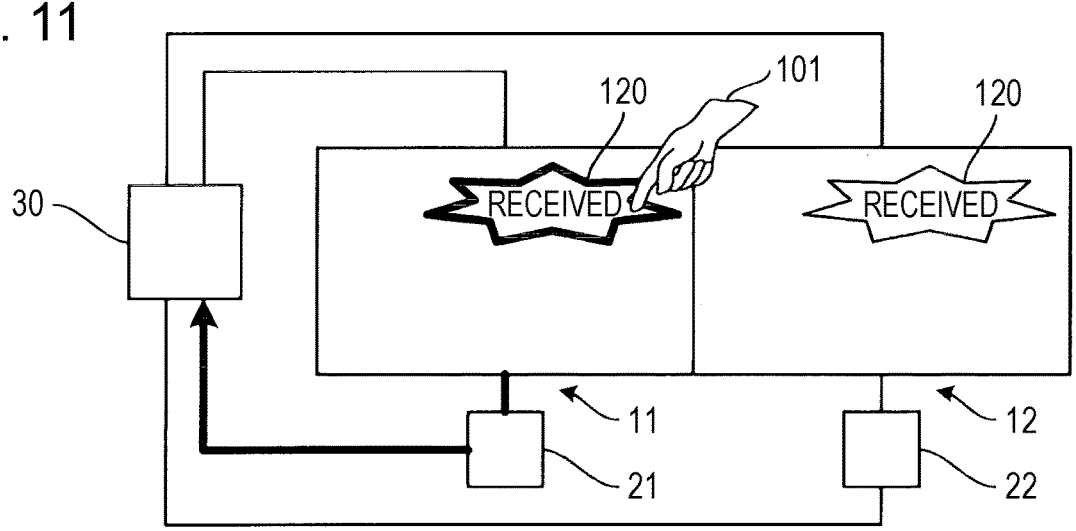
FIG. 11 is a diagram for describing extended operations (multiple-page image display processing) as operations (display processing) of the display system according to the first embodiment.

In a case where the user 101 has touched the display device 11 out of the multiple display devices 11 and 12 (Yes in step S3 in FIG. 4), the input detection device 21 out of the multiple input detection devices 21 and 22 detects the user touching the display device 11, as illustrated in FIG. 11. The device selecting unit 131 (FIG. 1) of the control device 30 selects, out of the multiple display devices 11 and 12, the display device 11 that the user 101 has touched (step S4 in FIG. 4).

Now, various methods are conceivable as notification from the selected display device (e.g., the display device 11) to the control device 30. For example, when the input detection device 21 detects the user touching the display device 11, a content display selection signal is transmitted to the control device 30. The control device 30 selects the display device 11 that has been touched by receiving the content display selection signal.

In a case where there is message information 120 existing at the position touched by the user 101 on the selected display device 11 (Yes in step S5 in FIG. 4), the display control unit 132 (FIG. 1) of the control device 30 confirms the size of the multiple-page image data P1 through P3 as confirmation of the multiple-page image data P1 through P3 (content) (step S6 in FIG. 4). The display control unit 132 (FIG. 1) displays the image data P1 that is the first page of the multiple-page image data P1 through P3, in a displayable region of the selected display device 11 (step S7 in FIG. 4), as illustrated in FIG. 12.

That is to say, the control device 30 transmits the content (image data) to the display device regarding which the content display selection signal has been transmitted (e.g., the display device 11). Regarding the transmission method of the content, in a case where the image data has multiple pages, each may be transmitted as necessary, or may be transmitted in a batch, as a matter of course.

Figure 12:
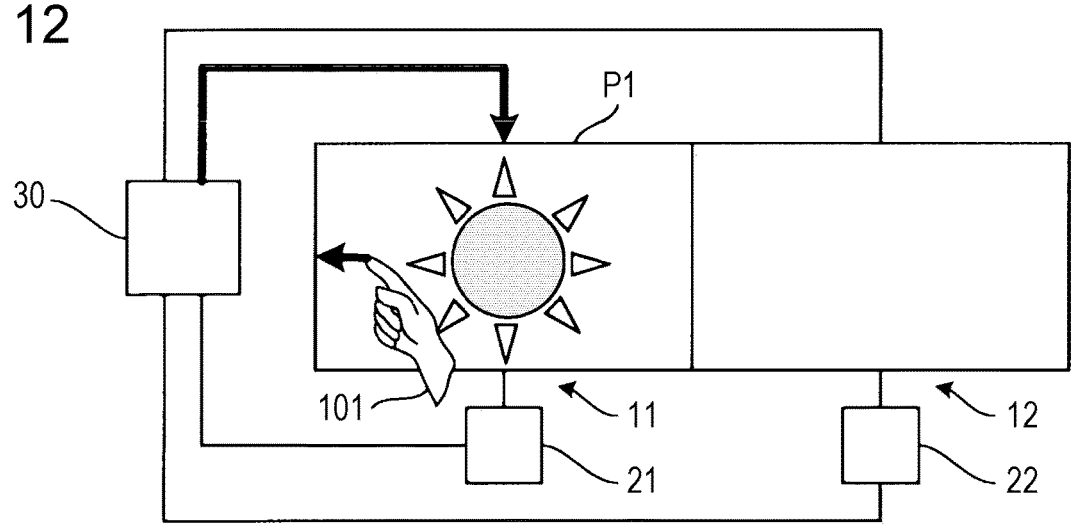
FIG. 12 is a diagram for describing extended operations (multiple-page image display processing) as operations (display processing) of the display system according to the first embodiment.
Figure 13:
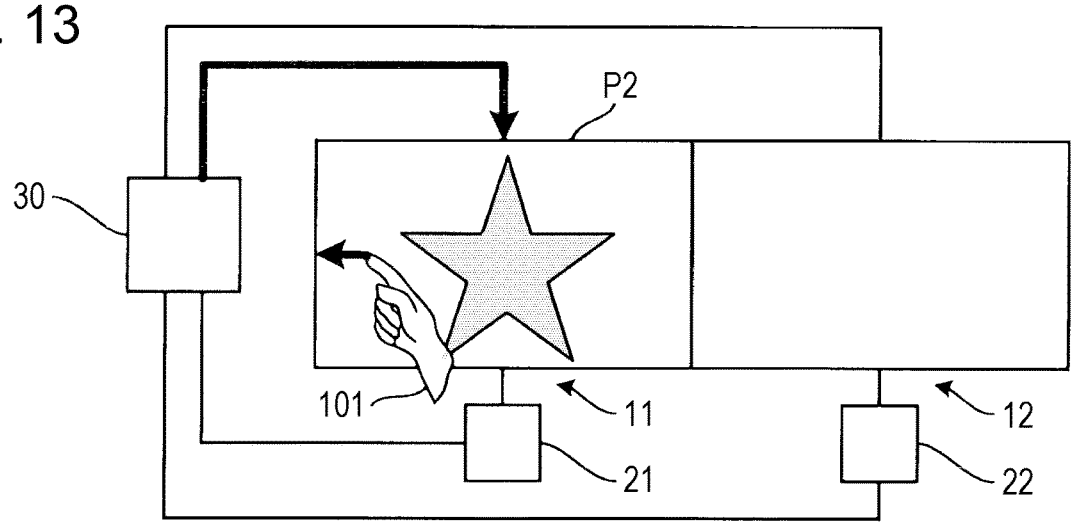
FIG. 13 is a diagram for describing extended operations (multiple-page image display processing) as operations (display processing) of the display system according to the first embodiment.
Figure 14:
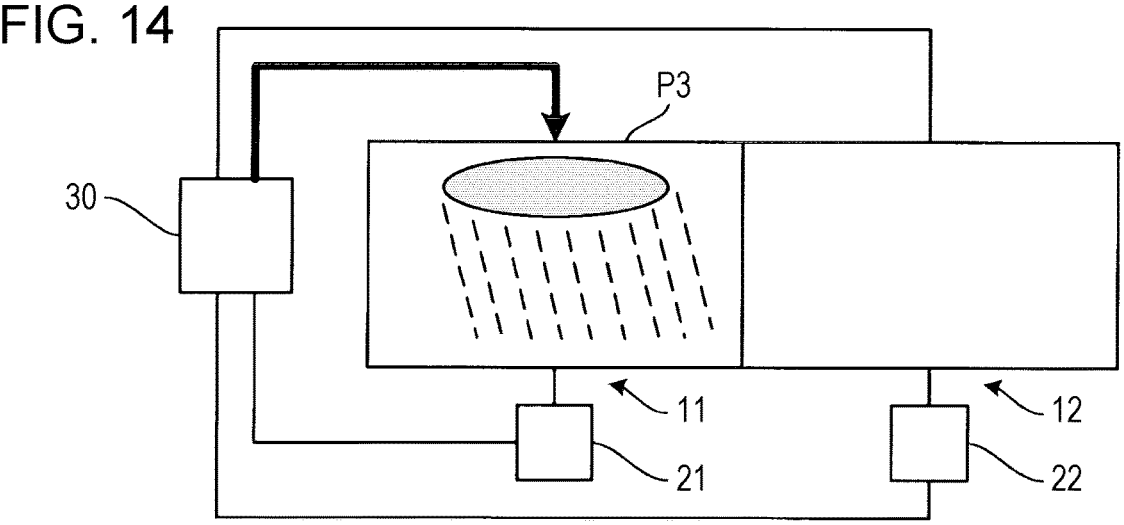
FIG. 14 is a diagram for describing extended operations (multiple-page image display processing) as operations (display processing) of the display system according to the first embodiment.

In step S7, the user 101 can perform a page operation (in this case, page forward) as to the selected display device 11, as illustrated in FIG. 12. A page operation (page forward, or page back) is an operation of touching and sliding (or flicking) as to the selected display device 11. In a case where a page operation (page forward) has been performed by the user 101, the display control unit 132 (FIG. 1) of the control device 30 displays image data P2 that is the second page out of the multiple-page image data P1 through P3 in a displayable region on the selected display device 11, as illustrated in FIG. 13. In a case where a further page operation (page forward) has been performed by the user 101, the display control unit 132 (FIG. 1) displays image data P3 that is the third page out of the multiple-page image data P1 through P3 in a displayable region on the selected display device 11, as illustrated in FIG. 14.

As described above, the display system according to the first embodiment includes the multiple display devices 11 and 12, and the control device 30 connected to the multiple display devices 11 and 12. The control device 30 has the device selecting unit 131 that causes the user 101 (teacher, presenter, etc.) to select one display device (the display device 11 in the case of the first embodiment) out of the multiple display devices 11 and 12, and the display control unit 132 that displays the image data P1 on the selected display device 11. Thus, in the display system according to the first embodiment, in a case of considering a multi-display where the multiple display devices 11 and 12 are arrayed, the user 101 selects the display device 11 before the image data P1 is displayed, thereby displaying the image data P1 on the selected display device 11 without displaying the image data P1 across the multiple display devices 11 and 12. Thus, according to the display system of the first embodiment, the image data P1 can be displayed at a position (the selected display device 11) intended by the user 101, so that the image data P1 is made to be more readily viewed by the user 101 and audience 102 (students, participants, etc.) when displaying the image data P1 on the multiple display devices 11 and 12.

Also, in the display system according to the first embodiment, the device selecting unit 131 has the notification control unit 131A that, when there is input or reception of the image data P1, the device selecting unit 131 notifies the user 101 to that effect by the multiple display devices 11 and 12, and the device selecting unit 131 selects the display device 11 that the user 101 has instructed (touched) out of the multiple display devices 11 and 12. Thus, in the display system according to the first embodiment, in a case where the user 101 is notified to the effect that there has been input of reception of the image data P1 by the multiple display devices 11 and 12, the display device 11 can be selected by the user 101 as the display device to display the image data P1, by instructing (touching) the display device 11 out of the multiple display devices 11 and 12.

Also, in the display system according to the first embodiment, when there has been input or reception of the image data P1, the notification control unit 131A notifies the user 101 by displaying notification information to that effect on the multiple display devices 11 and 12. Specifically, the notification information is the message information 120 for notifying that there has been input or reception of image data by a message. In this way, when there has been input or reception of the image data P1 in the display system according to the first embodiment, notification information (message information 120) is displayed on the multiple display devices 11 and 12, whereby the user 101 can visually tell that the image data P1 has been input or received.

Also, in the display system according to the first embodiment, in a case where notification information (message information 120) exists at the position instructed (touched) by the user 101 on the selected display device 11, the display control unit 132 displays the image data P1 on the selected display device 11. Accordingly, in the display system according to the first embodiment, in a case where no notification information (message information 120) exists at the position instructed (touched) by the user 101 on the selected display device 11, input information input (drawn) by the user 101 can be displayed at that position.

Second Embodiment

Points that have been changed from the first embodiment will be described regarding a display system according to a second embodiment.

FIGS. 15 through 23 are diagrams for describing extended operations (switching display processing) as operations (display processing) of the display system according to the second embodiment.

Figure 15:
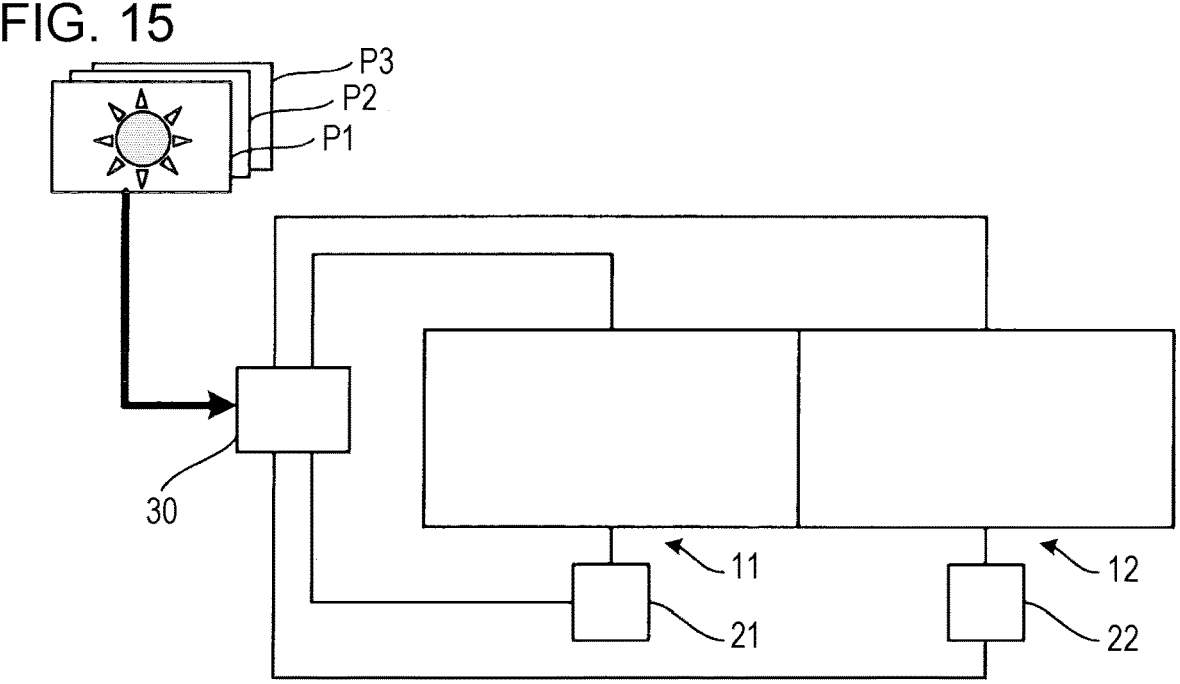
FIG. 15 is a diagram for describing extended operations (switching display processing) as operations (display processing) of a display system according to a second embodiment.
Figure 16:
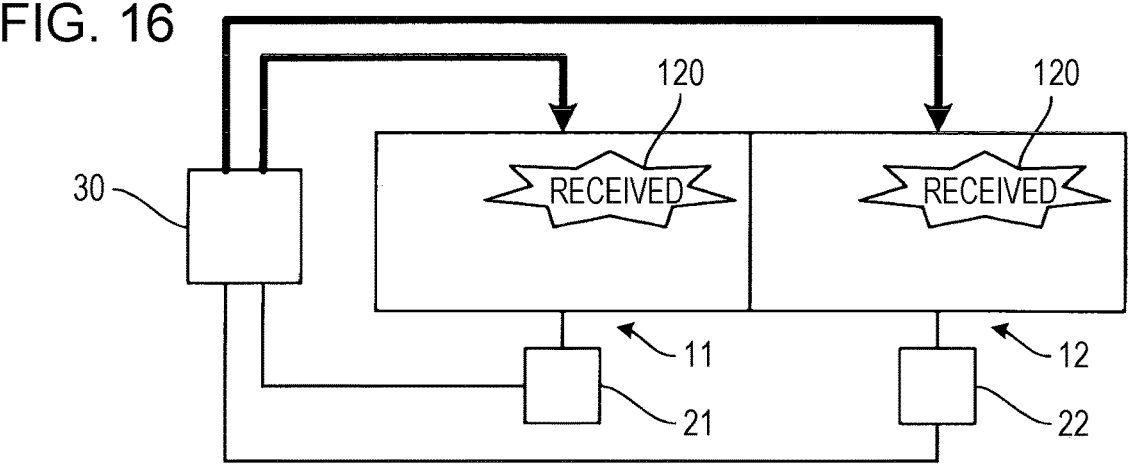
FIG. 16 is a diagram for describing extended operations (switching display processing) as operations (display processing) of the display system according to the second embodiment.

The control unit 32 (FIG. 1) of the control device 30 inputs or receives (step S1 in FIG. 4) multiple-page image data P1 through P3 (content), from the first page through the third page as illustrated in FIG. 15. At this time, the control unit 32 (FIG. 1) saves the multiple-page image data P1 through P3 in the folder 142 (FIG. 1). The notification control unit 131A (FIG. 1) displays notification information (message information 120) to the effect that the multiple-page image data P1 through P3 has been input or received to the user 101 (FIG. 3), by displaying on the multiple display devices 11 and 12, as illustrated in FIG. 16 (step S2 in FIG. 4).

Figure 17:
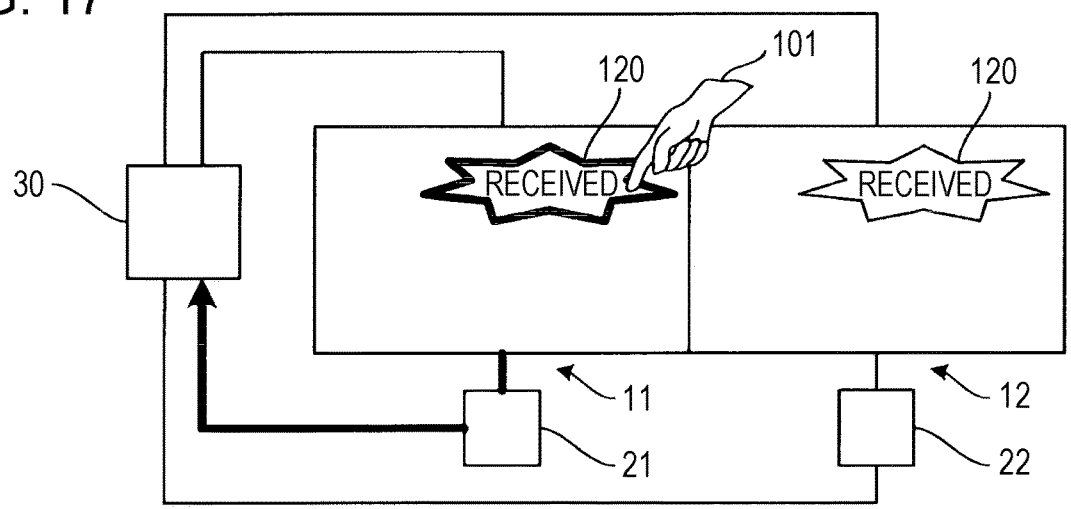
FIG. 17 is a diagram for describing extended operations (switching display processing) as operations (display processing) of the display system according to the second embodiment.

In a case where the user 101 has touched the display device 11 out of the multiple display devices 11 and 12 (Yes in step S3 in FIG. 4), the input detection device 21 out of the multiple input detection devices 21 and 22 detects the user touching the display device 11 as illustrated in FIG. 17. The device selecting unit 131 (FIG. 1) of the control device 30 selects, out of the multiple display devices 11 and 12, the display device 11 that the user 101 has touched (step S4 in FIG. 4).

Figure 18:
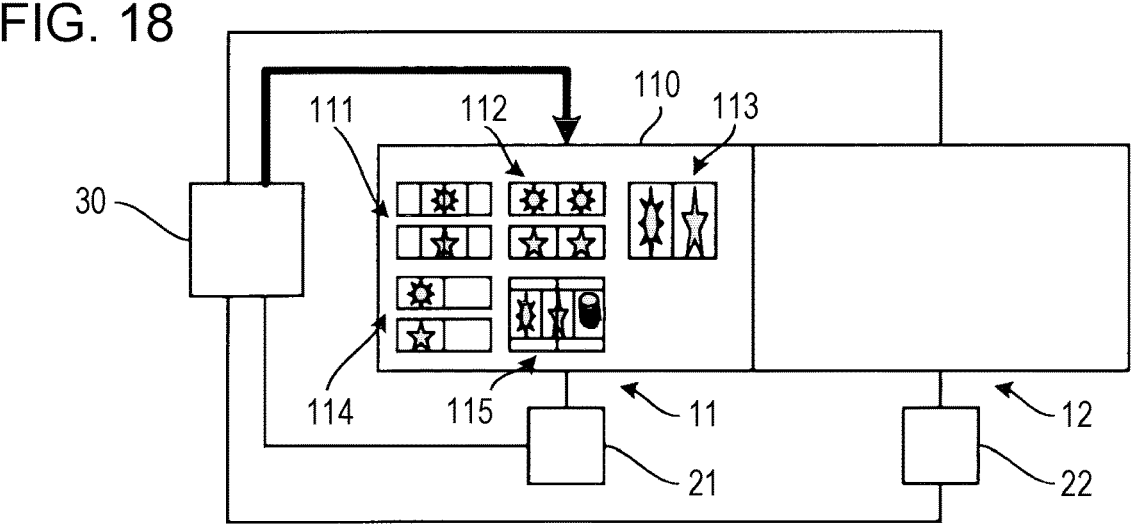
FIG. 18 is a diagram for describing extended operations (switching display processing) as operations (display processing) of the display system according to the second embodiment.

In a case where there is message information 120 existing at the position touched by the user 101 on the selected display device 11 (Yes in step S5 in FIG. 4), the display control unit 132 (FIG. 1) of the control device 30 displays a display method selection screen 110 such as illustrated in FIG. 18 as confirmation of the display method of the multiple-page image data P1 through P3 (content), at a displayable region of the selected display device 11 (step S6 in FIG. 4). The display method selection screen 110 includes display pattern selection spaces 111 through 115, corresponding to first through fifth display patterns, for example. In a case where the user 101 touches one display pattern selection space out of the display pattern selection spaces 111 through 115, the display control unit 132 displays the multiple-page image data P1 through P3 in accordance with the display pattern correlated with the display pattern selection space that has been touched, in a displayable region of the multiple display devices 11 and 12 including at least the selected display device 11 (step S7 in FIG. 4).

Figure 19:
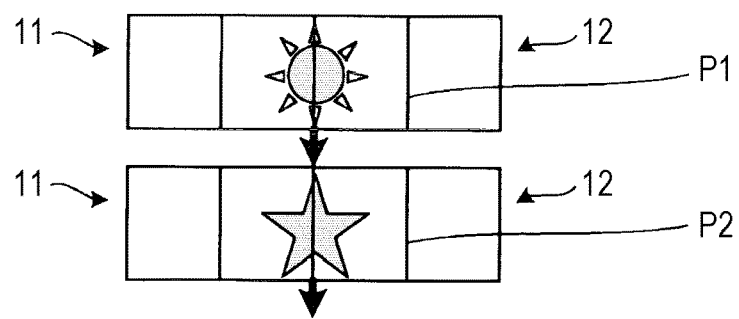
FIG. 19 is a diagram for describing extended operations (switching display processing) as operations (display processing) of the display system according to the second embodiment.

For example, in a case where the user 101 touches the display pattern selection space 111 out of the display pattern selection spaces 111 through 115, the display control unit 132 (FIG. 1) of the control device 30 selects the first display pattern out of the first through fifth display patterns. In the first display pattern, the display control unit 132 (FIG. 1) displays image data P1 of the first page out of the multiple-page image data P1 through P3 across the displayable region of the display device 11 and the displayable region of the display device 12, as illustrated in FIG. 19. In a case where a page operation (page forward) is performed by the user 101, the display control unit 132 (FIG. 1) displays image data P2 of the second page out of the multiple-page image data P1 through P3 across the displayable region of the display device 11 and the displayable region of the display device 12. In a case where a further page operation (page forward) is performed by the user 101, the display control unit 132 (FIG. 1) displays image data P3 of the third page out of the multiple-page image data P1 through P3 across the displayable region of the display device 11 and the displayable region of the display device 12.

Figure 20:
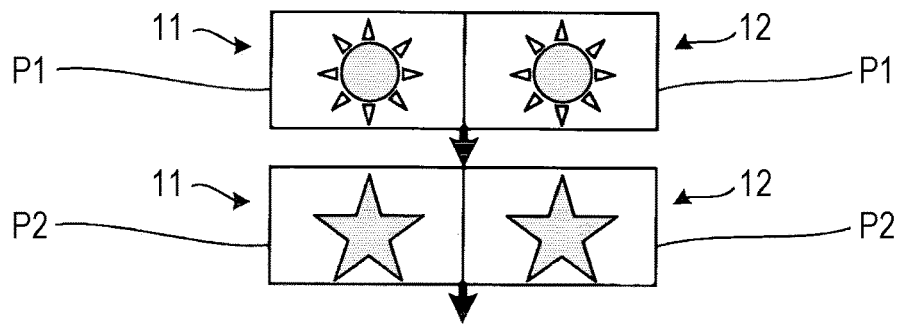
FIG. 20 is a diagram for describing extended operations (switching display processing) as operations (display processing) of the display system according to the second embodiment.

For example, in a case where the user 101 touches the display pattern selection space 112 out of the display pattern selection spaces 111 through 115, the display control unit 132 (FIG. 1) of the control device 30 selects the second display pattern out of the first through fifth display patterns. In the second display pattern, the display control unit 132 (FIG. 1) displays image data P1 of the first page out of the multiple-page image data P1 through P3 in both of the displayable region of the display device 11 and the displayable region of the display device 12, as illustrated in FIG. 20. In a case where a page operation (page forward) is performed by the user 101, the display control unit 132 (FIG. 1) displays image data P2 of the second page out of the multiple-page image data P1 through P3 in both of the displayable region of the display device 11 and the displayable region of the display device 12. In a case where a further page operation (page forward) is performed by the user 101, the display control unit 132 (FIG. 1) displays image data P3 of the third page out of the multiple-page image data P1 through P3 in both of the displayable region of the display device 11 and the displayable region of the display device 12.

Figure 21:
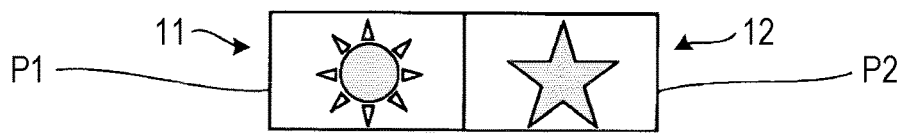
FIG. 21 is a diagram for describing extended operations (switching display processing) as operations (display processing) of the display system according to the second embodiment.

For example, in a case where the user 101 touches the display pattern selection space 113 out of the display pattern selection spaces 111 through 115, the display control unit 132 (FIG. 1) of the control device 30 selects the third display pattern out of the first through fifth display patterns. In the third display pattern, the display control unit 132 (FIG. 1) displays, out of the multiple-page image data P1 through P3, the first page image data P1 and second page image data P2 in the displayable region of the display device 11 and the displayable region of the display device 12, respectively as illustrated in FIG. 21. In a case where a page operation (page forward) is performed by the user 101, the second page image data P2 and third page image data P3 out of the multiple-page image data P1 through P3 are displayed in the displayable region of the display device 11 and the displayable region of the display device 12, respectively.

Figure 22:
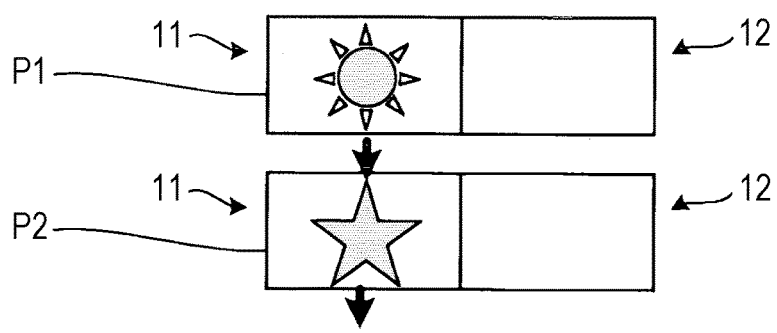
FIG. 22 is a diagram for describing extended operations (switching display processing) as operations (display processing) of the display system according to the second embodiment.

For example, in a case where the user 101 touches the display pattern selection space 114 out of the display pattern selection spaces 111 through 115, the display control unit 132 (FIG. 1) of the control device 30 selects the fourth display pattern out of the first through fifth display patterns. In the fourth display pattern, the display control unit 132 (FIG. 1) displays image data P1 of the first page out of the multiple-page image data P1 through P3 in the displayable region of the display device 11, as illustrated in FIG. 22. In a case where a page operation (page forward) is performed by the user 101, the display control unit 132 (FIG. 1) displays image data P2 of the second page out of the multiple-page image data P1 through P3 in the displayable region of the display device 11. In a case where a further page operation (page forward) is performed by the user 101, the display control unit 132 (FIG. 1) displays image data P3 of the third page out of the multiple-page image data P1 through P3 in the displayable region of the display device 11. The display method according to the fourth display pattern is the same as the extended operations (multiple-page image display processing) according to the first embodiment, except for the operation of causing the user 101 to select the display pattern on the display method selection screen 110.

Figure 23:
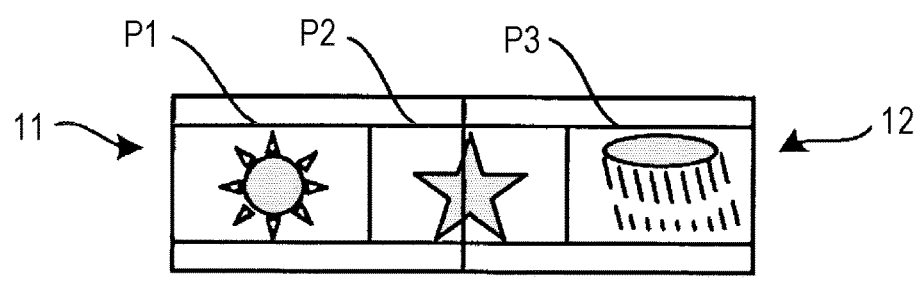
FIG. 23 is a diagram for describing extended operations (switching display processing) as operations (display processing) of the display system according to the second embodiment.

For example, in a case where the user 101 touches the display pattern selection space 115 out of the display pattern selection spaces 111 through 115, the display control unit 132 (FIG. 1) of the control device 30 selects the fifth display pattern out of the first through fifth display patterns. In the fifth display pattern, the display control unit 132 (FIG. 1) changes the size of the multiple-page image data P1 through P3 so as to fit in the displayable region of the display device 11 and the displayable region of the display device 12, as illustrated in FIG. 23. The multiple-page image data P1 through P3 of which the size has been changed is arrayed in the array direction of the display devices 11 and 12 and displayed in the displayable regions of the display devices 11 and 12.

As described above, the display system according to the second embodiment includes the multiple display devices 11 and 12, and the control device 30 connected to the multiple display devices 11 and 12. The control device 30 has the device selecting unit 131 that causes the user 101 (teacher, presenter, etc.) to select at least one display device (the display device 11 in the case of the second embodiment) out of the multiple display devices 11 and 12 (the display devices 11 and 12 in the case of the second, third, and fifth display patterns) (the display device 11 in the case of the fourth pattern), and the display control unit 132 that displays the image data on the selected display device. Thus, in the display system according to the second embodiment, in a case of taking into consideration a multi-display where multiple display devices 11 and 12 are arrayed, the image data is displayed on selected display devices instead of being displayed across the multiple display devices 11 and 12, by the user 101 selecting display devices before displaying image data. Thus, in the display system according to the second embodiment, when displaying image data on the multiple display devices 11 and 12, the image data can be displayed at positions intended but the user (selected display devices) to facilitate viewing of the image data by the user 101 and audience 102 (students, participants, etc.)

Third Embodiment

Points that have been changed from the first embodiment will be described regarding a display system according to a third embodiment.

Figure 24:
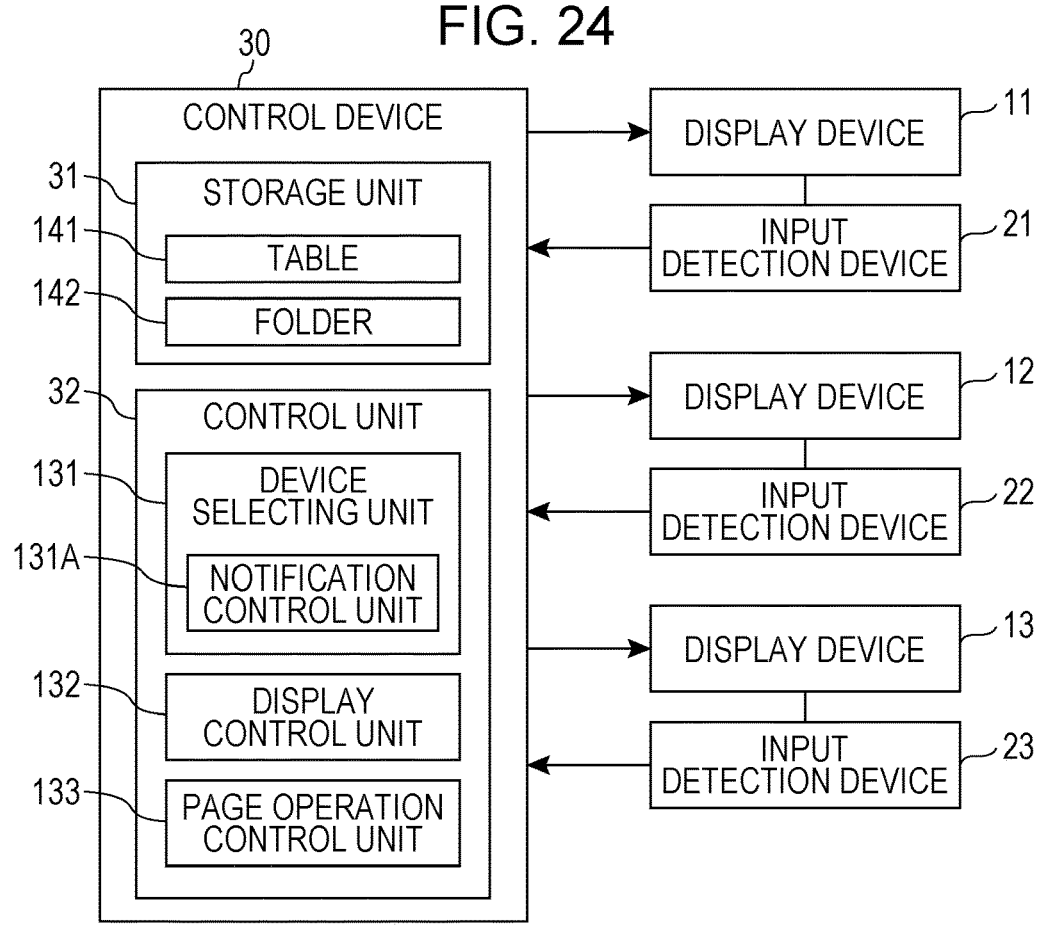
FIG. 24 is a block diagram illustrating the configuration of a display system according to a third embodiment.

FIG. 24 is a block diagram illustrating the configuration of the display system of the third embodiment. As illustrated in FIG. 24, the multiple display devices are display devices 11 through 13, for example, and the multiple input detection devices are input detection devices 21 through 23. The multiple input detection devices 21 through 23 are provided to the respective multiple display devices 11 through 13.

FIGS. 25 through 28 are diagrams for describing operations (display processing) of the display system according to the third embodiment.

Figure 25:
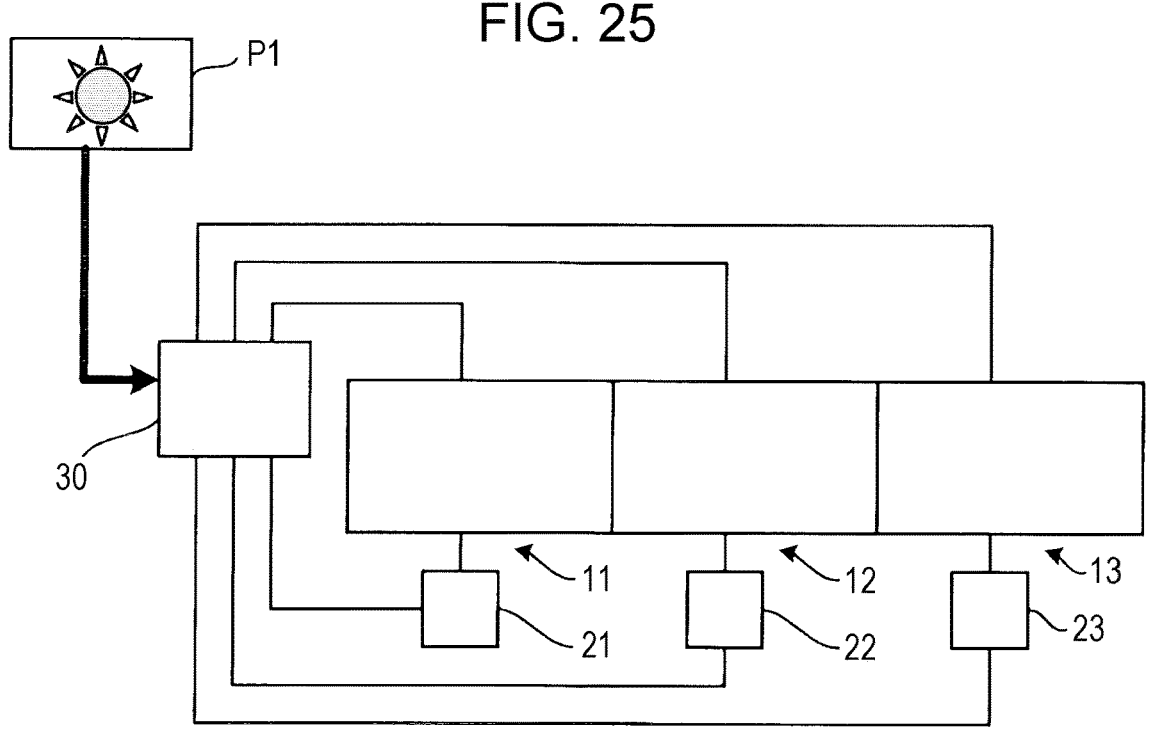
FIG. 25 is a diagram for describing operations (display processing) of the display system according to the third embodiment.
Figure 26:
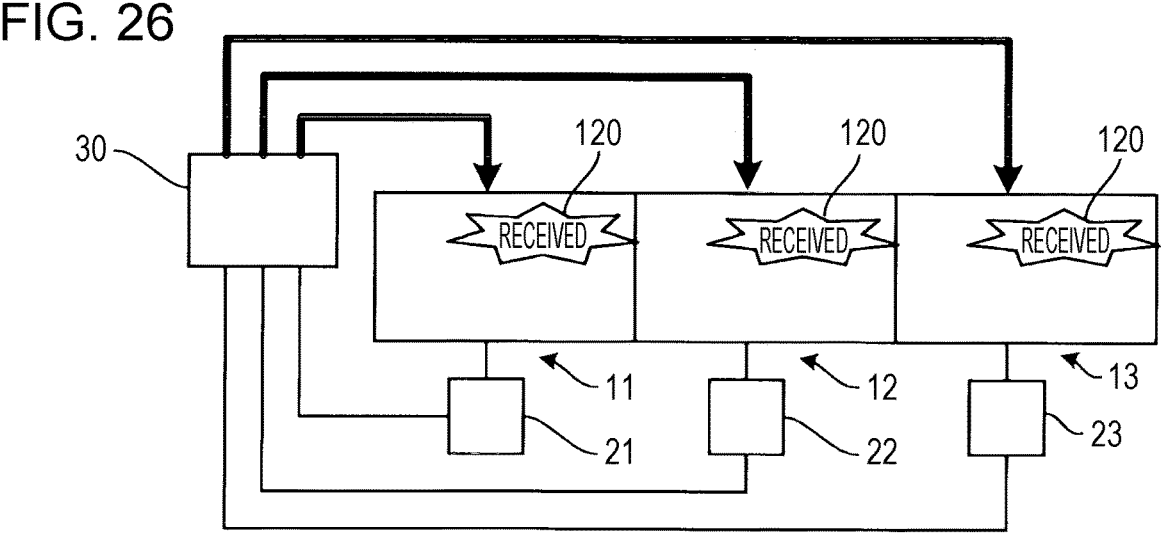
FIG. 26 is a diagram for describing operations (display processing) of the display system according to the third embodiment.

The control unit 32 (FIG. 24) of the control device 30 inputs or receives (step S1 in FIG. 4) image data P1 (content), as illustrated in FIG. 25. At this time, the control unit 32 (FIG. 24) saves the image data P1 in the folder 142 (FIG. 24). The notification control unit 131A (FIG. 24) displays notification information (message information 120) to the effect that the image data P1 has been input or received to the user 101 (FIG. 3), by displaying on the multiple display devices 11 through 13, as illustrated in FIG. 26 (step S2 in FIG. 4).

Figure 27:
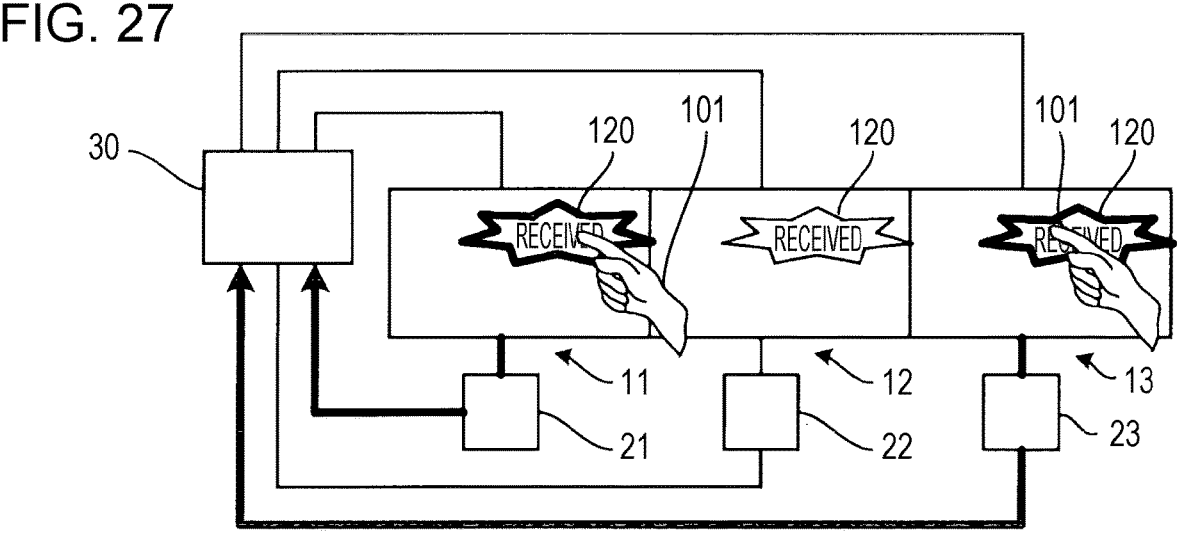
FIG. 27 is a diagram for describing operations (display processing) of the display system according to the third embodiment.

In a case where the user 101 has touched the display devices 11 and 13 out of the multiple display devices 11 through 13 (Yes in step S3 in FIG. 4), the input detection devices 21 and 23 out of the multiple input detection devices 21 through 23 detect the user touching the respective display devices 11 and 13 as illustrated in FIG. 27. The device selecting unit 131 (FIG. 24) of the control device 30 selects, out of the multiple display devices 11 through 13, the display devices 11 and 13 that the user 101 has touched (step S4 in FIG. 4).

Figure 28:
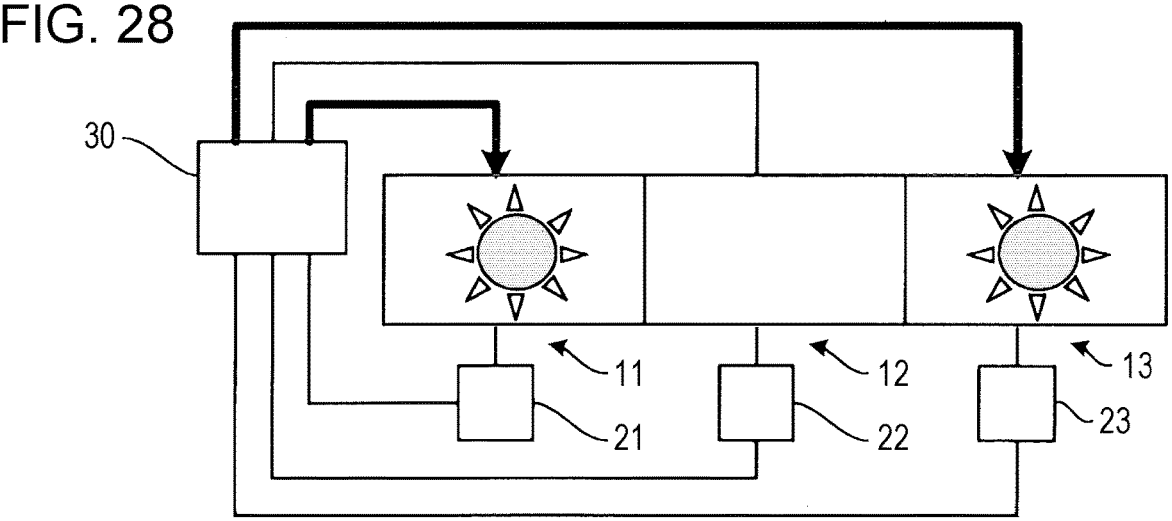
FIG. 28 is a diagram for describing operations (display processing) of the display system according to the third embodiment.

In a case where there is message information 120 existing at each of the positions touched by the user 101 on the selected display devices 11 and 13 (Yes in step S5 in FIG. 4), the display control unit 132 (FIG. 24) of the control device 30 confirms the size of the image data P1 as confirmation of the image data P1 (content) (step S6 in FIG. 4). The display control unit 132 (FIG. 24) displays the image data P1, in a displayable region of the selected display devices 11 and 13 (step S7 in FIG. 4), as illustrated in FIG. 28.

As described above, the display system according to the third embodiment includes the multiple display devices 11 through 13, and the control device 30 connected to the multiple display devices 11 through 13. The control device 30 has the device selecting unit 131 that causes the user 101 (teacher, presenter, etc.) to select at least one display device (the display devices 11 and 13 in the case of the third embodiment) out of the multiple display devices 11 through 13, and the display control unit 132 that displays the image data P1 on the selected display devices 11 and 13. Thus, in the display system according to the third embodiment, in a case of taking into consideration a multi-display where multiple display devices 11 through 13 are arrayed, the image data P1 is displayed on selected display devices 11 and 13 instead of being displayed across multiple display devices (in this case, without the image data P1 being displayed across the multiple display devices 11 and 12 or across the multiple display devices 12 and 13), by the user 101 selecting the display devices 11 and 13 before displaying the image data P1. Thus, in the display system according to the third embodiment, when displaying image data on the multiple display devices 11 through 13, the image data P1 can be displayed at positions intended by the user 101 (selected display devices 11 and 13) to facilitate viewing of the image data by the user 101 and audience 102 (students, participants, etc.)

Fourth Embodiment

Points that have been changed from the third embodiment will be described regarding a display system according to a fourth embodiment.

Figure 29:
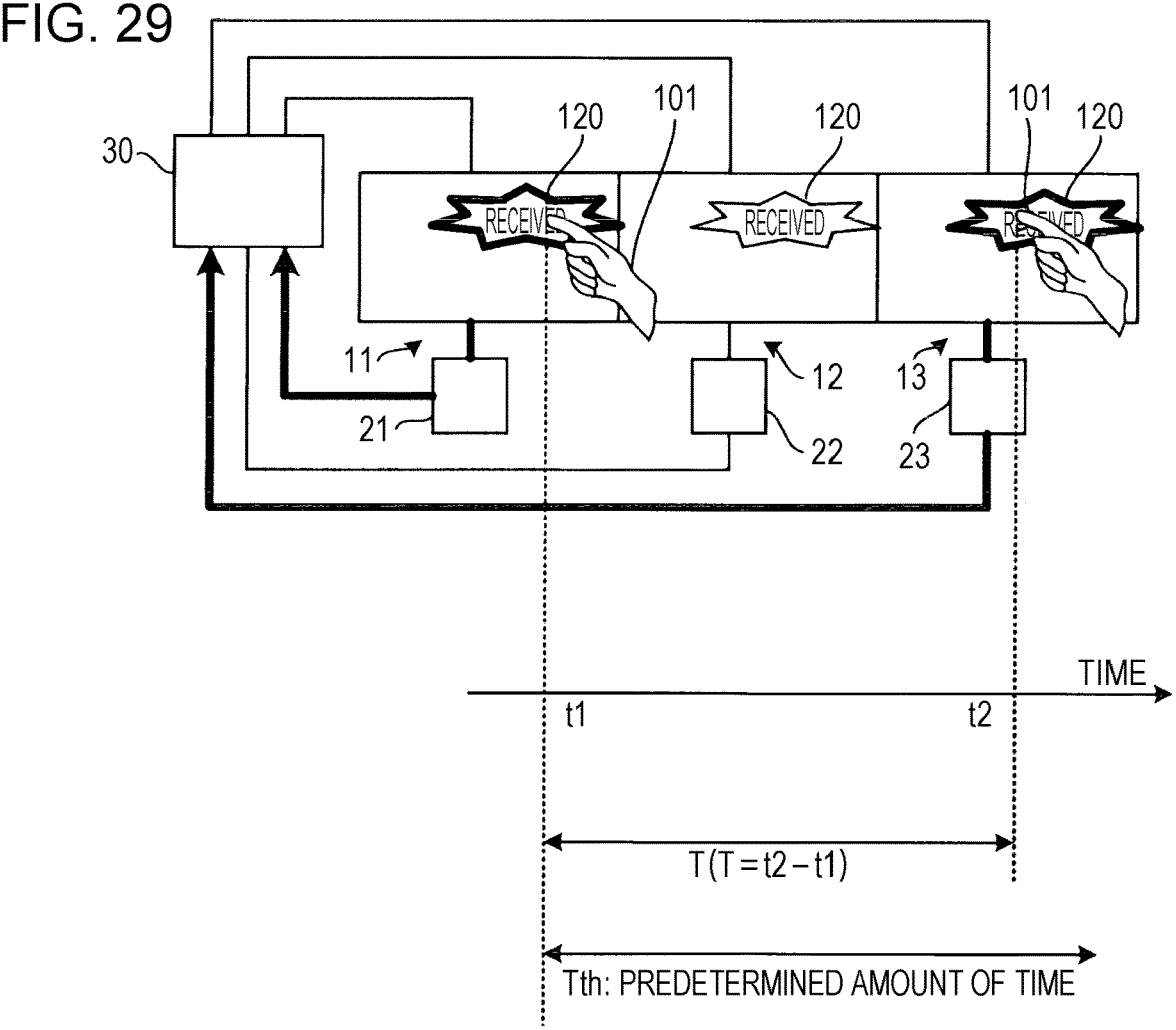
FIG. 29 is a diagram for describing operations (display processing) of a display system according to a fourth embodiment.

Operations (display processing) of the display system according to the fourth embodiment will be described with reference to FIGS. 25, 26, 28, and 29. FIG. 29 is a diagram for describing operations (display processing) of a display system according to the fourth embodiment.

The control unit 32 (FIG. 24) of the control device 30 inputs or receives (step S1 in FIG. 4) image data P1 (content), as illustrated in FIG. 25. At this time, the control unit 32 (FIG. 24) saves the image data P1 in the folder 142 (FIG. 24). The notification control unit 131A (FIG. 24) displays notification information (message information 120) to the effect that the image data P1 has been input or received to the user 101 (FIG. 3), by displaying on the multiple display devices 11 through 13, as illustrated in FIG. 26 (step S2 in FIG. 4).

In a case where the user 101 has touched two of the multiple display devices 11 through 13 (Yes in step S3 in FIG. 4), two of the multiple input detection devices 21 through 23 detect the user touching the respective two display devices as illustrated in FIG. 29. Assumption will be made here that the user 101 has touched the display device 11 out of the multiple display devices 11 through 13 at a point in time t1, and touched the display device 13 out of the multiple display devices 11 through 13 at a point in time t2. The amount of time T from point in time t1 to point in time t2 is within a predetermined amount of time Tth. In this case, the device selecting unit 131 (FIG. 24) of the control device 30 selects the display device 11 first touched by the user 101, and the display device 13 touched within the predetermined amount of time Tth after the user 101 first touching (step S4 in FIG. 4).

Now, in a case where there is message information 120 existing at the respective positions touched by the user 101 on the selected display devices 11 and 13 (Yes in step S5 in FIG. 4), the display control unit 132 (FIG. 24) of the control device 30 confirms the size of the image data P1 as confirmation of the image data P1 (content) (step S6 in FIG. 4). The display control unit 132 (FIG. 24) displays the image data P1, in a displayable region of the selected display devices 11 and 13 (step S7 in FIG. 4), as illustrated in FIG. 28.

As described above, in the display system according to the fourth embodiment, the device selecting unit 131 selects the display device 11 first instructed (touched) by the user 101, and the display device 13 instructed (touched) within the predetermined amount of time Tth after the user 101 first instructing (touching), out of the multiple display devices 11 through 13. Thus, in the display system according to the fourth embodiment, by the user 101 selecting the display devices 11 and 13 within the predetermined amount of time Tth and displaying the image data P1 on the display devices 11 and 13, the user 101 can promptly perform description regarding the image data P1, for example.

Describing the fourth embodiment with reference to FIG. 47, the control device 30 receives a content display selection signal from the display device 11 (S120), and thereafter receives a content display selection signal from the display device 12 as well. Now, in a case where a content display selection signal is received in S120, and a content display selection signal is also received from the display device 13 within the predetermined amount of time Tth, the content is transmitted to the display device 13 as well.

Fifth Embodiment

Points that have been changed from the first embodiment will be described regarding a display system according to a fifth embodiment.

FIGS. 30 through 33 are diagrams for describing operations (display processing) of the display system according to the fifth embodiment. The multiple display devices 11 and 12 have speakers 500 as annunciation means, as illustrated in FIGS. 30 through 33.

Figure 30:
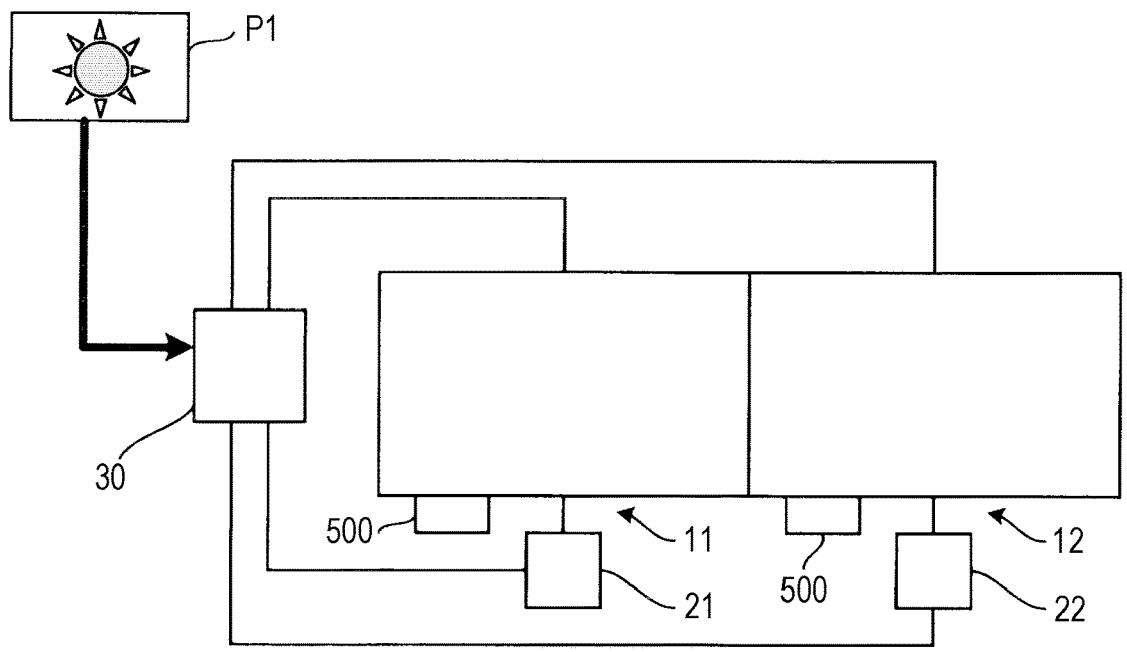
FIG. 30 is a diagram for describing operations (display processing) of a display system according to a fifth embodiment.
Figure 31:
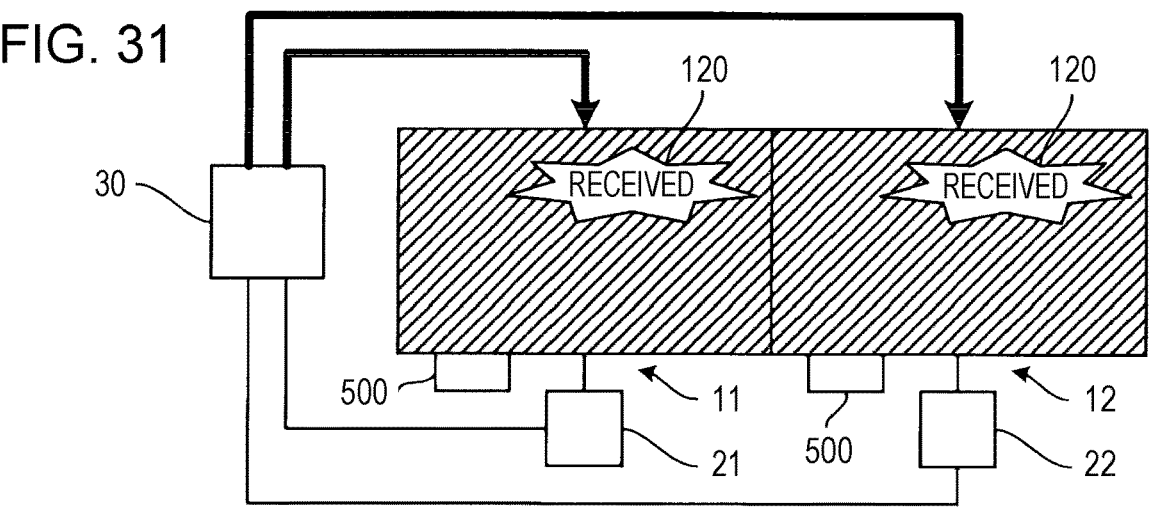
FIG. 31 is a diagram for describing operations (display processing) of the display system according to the fifth embodiment.

The control unit 32 (FIG. 1) of the control device 30 inputs or receives (step S1 in FIG. 4) image data P1 (content), as illustrated in FIG. 30. At this time, the control unit 32 (FIG. 1) saves the image data P1 in the folder 142 (FIG. 1). The notification control unit 131A (FIG. 1) displays notification information (message information 120) to the effect that the image data P1 has been input or received to the user 101 (FIG. 3), by displaying on the multiple display devices 11 and 12, as illustrated in FIG. 31. Also, when having input or received image data, the notification control unit 131A (FIG. 1) notifies the user 101 by blinking the display screens of the multiple display devices 11 and 12, to draw the attention of the user 101. As for blinking of the display screen, the entire displayable region (see hatched portion in FIG. 31) may be made to blink, or the message information 120 may be made to blink.

Also, when having input or received image data, the notification control unit 131A (FIG. 1) may notify the user 101 by outputting a sound to that effect from the speakers

500 provided to the multiple display devices 11 and 12 (step S2 in FIG. 4) to draw the attention of the user 101. The speakers 500 output sounds such as voices, warning sounds, melodies, etc.

Figure 32:
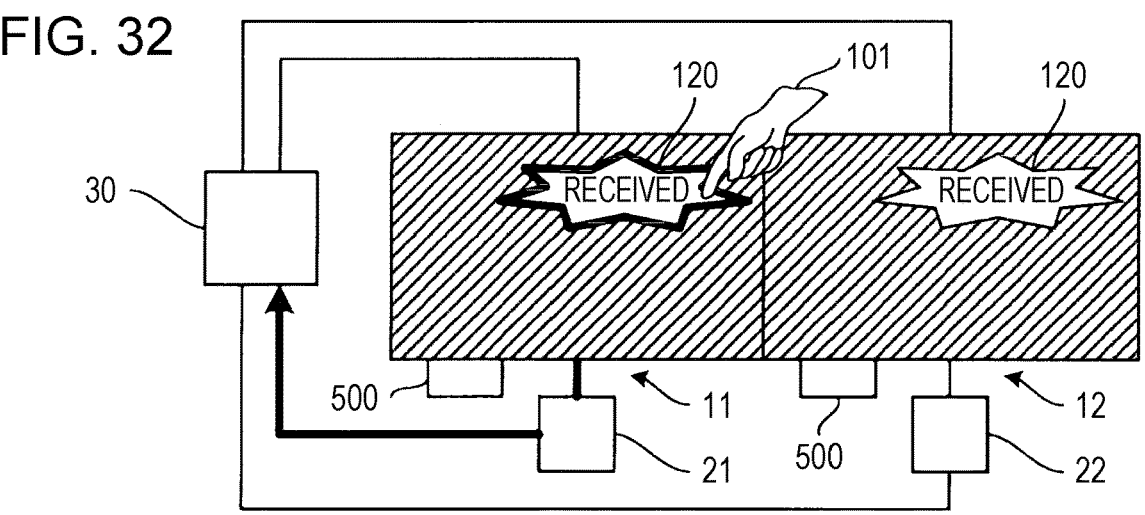
FIG. 32 is a diagram for describing operations (display processing) of the display system according to the fifth embodiment.

In a case where the user 101 has touched the display device 11 out of the multiple display devices 11 and 12 (Yes in step S3 in FIG. 4), the input detection device 21 out of the multiple input detection devices 21 and 22 detects the user touching the display device 11, as illustrated in FIG. 32. The device selecting unit 131 (FIG. 1) of the control device 30 selects, out of the multiple display devices 11 and 12, the display device 11 that the user 101 has touched (step S4 in FIG. 4).

Figure 33:
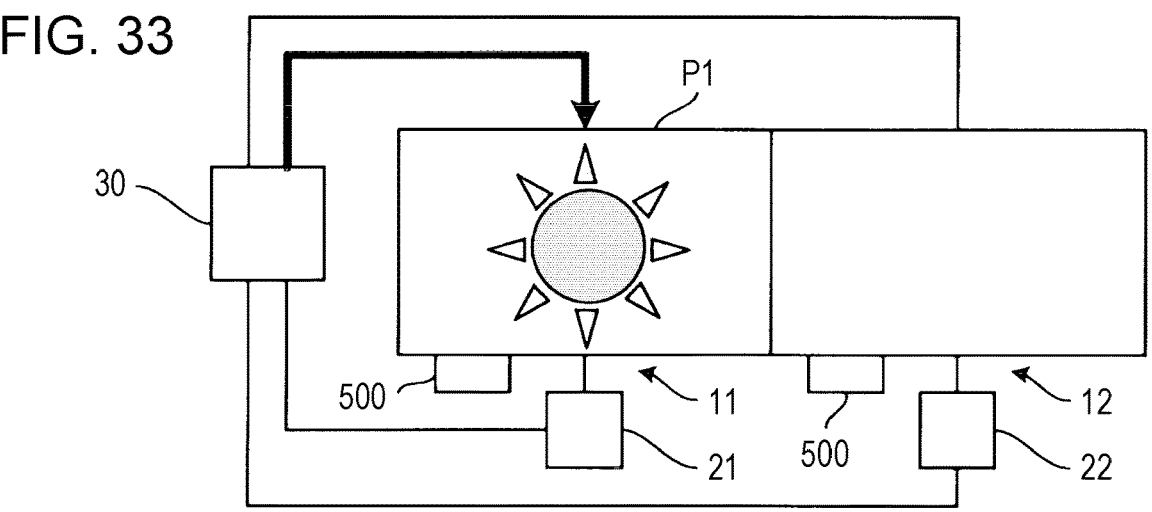
FIG. 33 is a diagram for describing operations (display processing) of the display system according to the fifth embodiment.

In a case where there is message information 120 existing at the position touched by the user 101 on the selected display device 11 (Yes in step S5 in FIG. 4), the display control unit 132 (FIG. 1) of the control device 30 confirms the size of the image data P1 as confirmation of the image data P1 (content) (step S6 in FIG. 4). The display control unit 132 (FIG. 1) displays the image data P1, in a displayable region of the selected display device 11 (step S7 in FIG. 4), as illustrated in FIG. 33.

As described above, in the display system according to the fifth embodiment, when having input or received image data P1, the user 101 is notified by the display screens of the multiple display devices 11 and 12 being made to blink by the notification control unit 131A. Thus, in the display system according to the fifth embodiment, when having input or received image data P1, the display screens of the multiple display devices 11 and 12 blink, so the user 101 can visually tell that image data P1 has been input or received.

Also, in the display system according to the fifth embodiment, the multiple display devices 11 and 12 are provided with speakers 500, and when having input or received image data P1, the notification control unit 131A outputs sound to that effect from the speakers 500 provided to the multiple display devices 11 and 12 to notify the user 101. Thus, in the display system according to the fifth embodiment, when having input or received image data P1, the sound to that effect is output from the speakers 500, so the user 101 can audibly tell that image data P1 has been input or received.

While description has been made of the display system according to the fifth embodiment regarding the method of displaying notification information (message information 120) on the multiple display devices 11 and 12, the method of blinking the display screens of the multiple display devices 11 and 12, and the method of outputting sound from the speakers 500 provided to the multiple display devices 11 and 12, as methods of notifying the user 101, these methods may be used individually or in combination.

That is to say, a configuration may be made where the display screen is made to blink or annunciation is made from the annunciation means without displaying the notification information (message information 120) on the display devices 11 and 12. Accordingly, operations to receive a content may be performed by performing predetermined operations at the displayed devices.

Also, while speakers 500 that output sound have been described as an example of the annunciation means, examples may include a device that makes annunciation by outputting another sound, such as a siren or the like, a device that makes annunciation by light such as a revolving light, a device that makes annunciation by vibrations, and so forth.

Sixth Embodiment

Points that have been changed from the first embodiment will be described regarding a display system according to a sixth embodiment.

Figure 34:
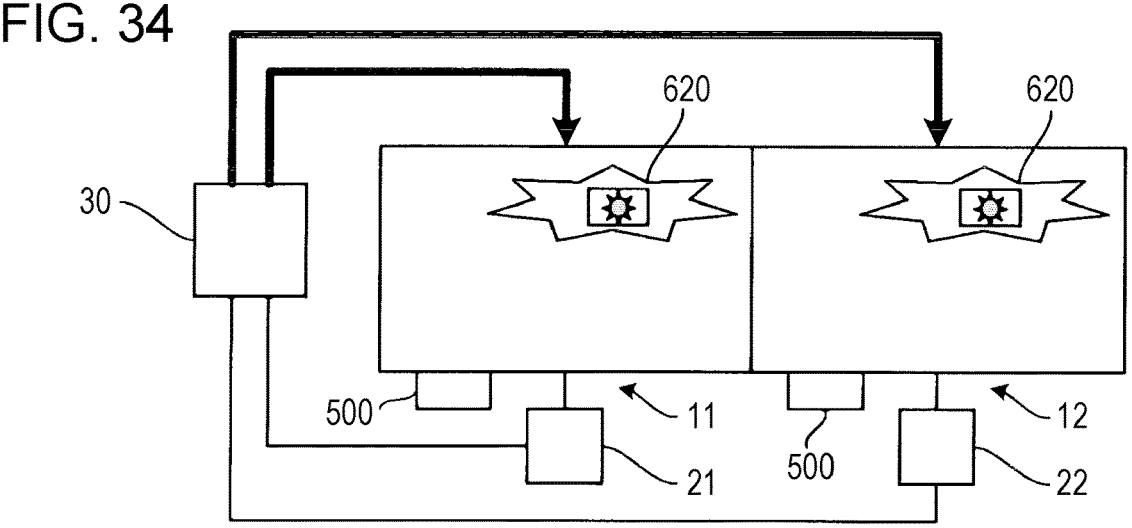
FIG. 34 is a diagram for describing operations (display processing) of a display system according to a sixth embodiment.
Figure 35:
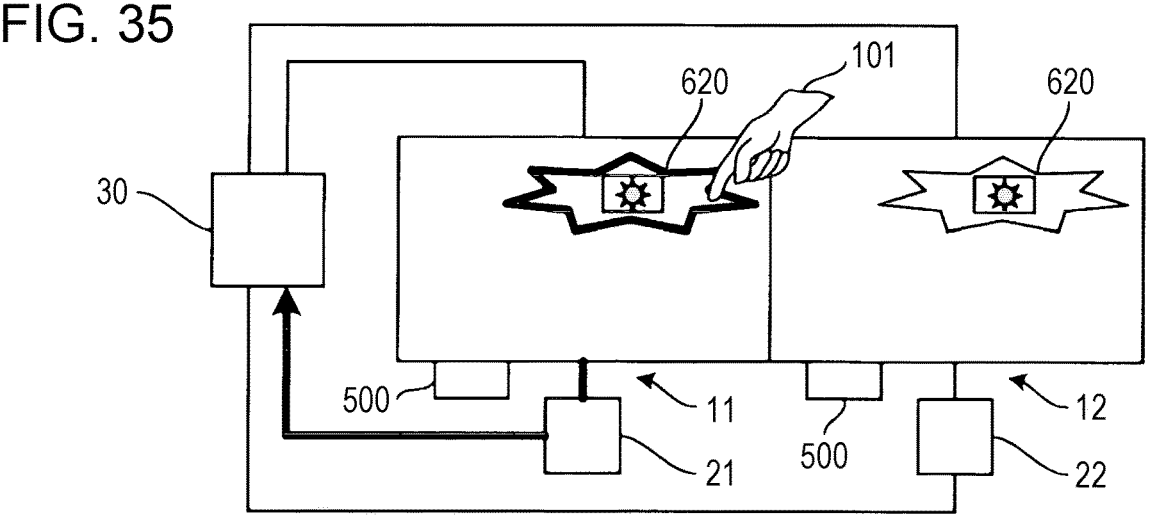
FIG. 35 is a diagram for describing operations (display processing) of the display system according to the sixth embodiment.
Figure 36:
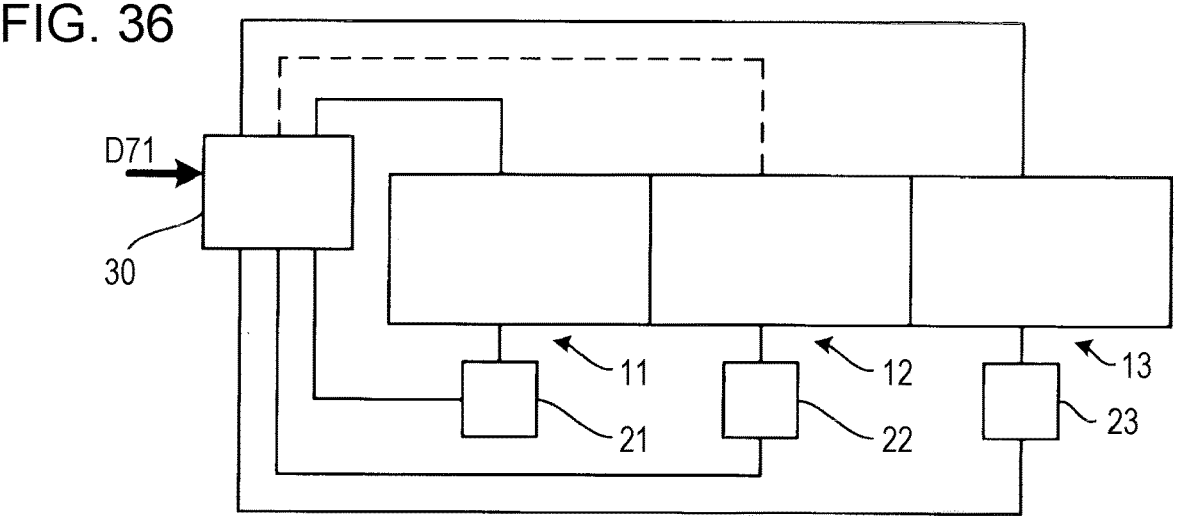
FIG. 36 is a diagram for describing operations (display processing) of a display system according to a seventh embodiment.
Figure 37:
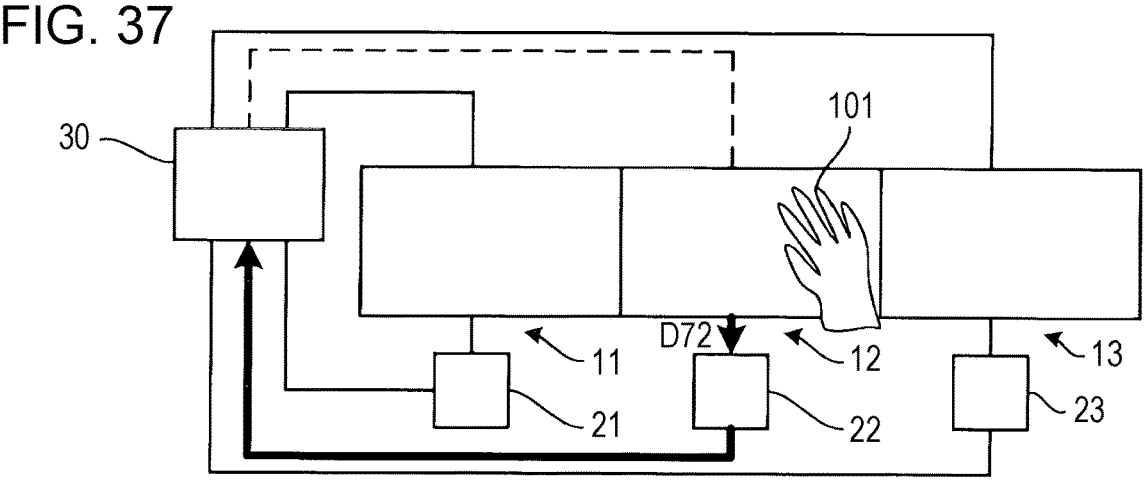
FIG. 37 is a diagram for describing operations (display processing) of the display system according to the seventh embodiment.

Operations (display processing) of the display system according to the sixth embodiment will be described with reference to FIGS. 5, 8, 34, and 35. FIGS. 34 and 35 are diagrams for describing operations (display processing) of the display system according to the sixth embodiment.

The control unit 32 (FIG. 1) of the control device 30 inputs or receives (step S1 in FIG. 4) image data P1 (content), as illustrated in FIG. 5. At this time, the control unit 32 (FIG. 1) saves the image data P1 in the folder 142 (FIG. 1). The notification control unit 131A (FIG. 1) displays notification information to the effect that the image data P1 has been input or received to the user 101 (FIG. 3), by displaying on the multiple display devices 11 and 12. The notification information is preview display information 620 to notify that image data has been input or received by a preview display, as illustrated in FIG. 34. For example, in a case where image data (content) has been received, a preview of the image data P1 is displayed on the multiple display devices 11 and 12 by the preview display information 620 (step S2 in FIG. 4).

In a case where the user 101 has touched the display device 11 out of the multiple display devices 11 and 12 (Yes in step S3 in FIG. 4), the input detection device 21 out of the multiple input detection devices 21 and 22 detects the user touching the display device 11, as illustrated in FIG. 35. The device selecting unit 131 (FIG. 1) of the control device 30 selects, out of the multiple display devices 11 and 12, the display device 11 that the user 101 has touched (step S4 in FIG. 4).

In a case where there is message information 120 existing at the position touched by the user 101 on the selected display device 11 (Yes in step S5 in FIG. 4), the display control unit 132 (FIG. 1) of the control device 30 confirms the size of the image data P1 as confirmation of the image data P1 (content) (step S6 in FIG. 4). The display control unit 132 (FIG. 1) displays the image data P1, in a displayable region of the selected display device 11 (step S7 in FIG. 4), as illustrated in FIG. 8.

As described above, in the display system according to the sixth embodiment, when image data P1 has been input or received, the notification control unit 131A notifies the user 101 by displaying notification information to that effect on the multiple display devices 11 and 12. Specifically, the notification information is the preview display information 620 for notifying that image data P1 has been input or received, by a preview display. Thus, with the display system according to the sixth embodiment, when image data P1 is input or received, the notification information (preview display information 620) is displayed on the multiple display devices 11 and 12, whereby the user 101 can visually tell that the image data P1 has been input or received.

Although only the method of displaying notification information (preview display information 620) on the multiple display devices 11 and 12 has been described as a method for notifying the user 101 regarding the display system according to the sixth embodiment, this is not restrictive. Methods of notifying the user 101 include the method of displaying the notification information (preview display information 620) on the multiple display devices 11 and 12, the method of causing the display screens of the multiple display devices 11 and 12 to blink, and the method of outputting sound from the speakers 500 provided to the multiple display devices 11 and 12. These methods may be used individually or in combination.

Seventh Embodiment

Points that have been changed from the third embodiment will be described regarding a display system according to a seventh embodiment.

FIGS. 36 through 41 are diagrams for describing operations (display processing) of the display system according to the seventh embodiment.

First, at the control device 30, the device selecting unit 131 (FIG. 24) selects display devices 11 and 13 out of the multiple display devices 11 through 13, by specification of the user 101 (FIG. 3) so that notification information (e.g., the message information 120 in FIG. 26) is not displayed on the display device 12 out of the multiple display devices 11 through 13.

For example, the user 101 gives specification information D71 for specifying the display devices 11 and 13 out of the multiple display devices 11 through 13, to the control device 30, and the device selecting unit 131 (FIG. 24) selects the display devices 11 and 13 out of the multiple display devices 11 through 13 based on the specification information D71. That is to say, the display device 12 is set to be a non-selected display device out of the multiple display devices 11 through 13 (see dotted line in FIG. 36).

Alternatively, the user 101 gives non-specification information D72 to the display device 12 out of the multiple display devices 11 through 13 so as not to specify the display device 12, and the device selecting unit 131 (FIG. 24) selects, out of the multiple display devices 11 through 13, the display devices 11 and 13 other than the display device 12, based on the non-specification information D72. That is to say, out of the multiple display devices 11 through 13, the display device 12 is set to be a non-selected display device (see dotted line in FIG. 37). Giving the non-specification information D72 is realized by the user 101 touching the display device 12 with the palm of the hand for a set amount of time or longer. Note that another method may be used as the method for giving the non-specification information D72, as long as it is distinguishable for input of input information and so forth.

Figure 38:
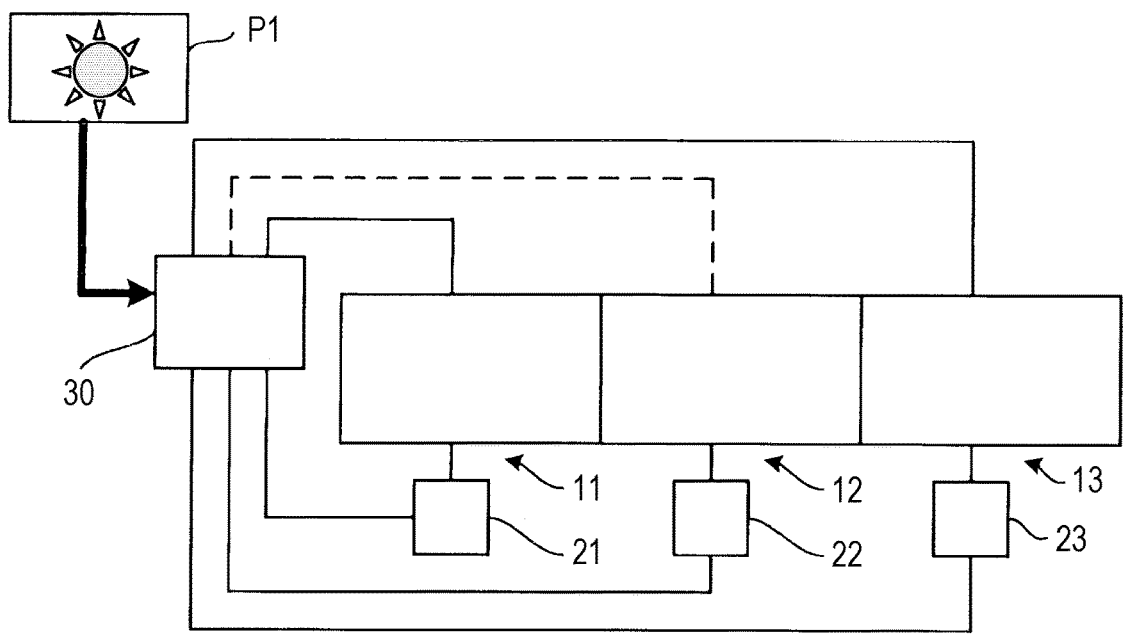
FIG. 38 is a diagram for describing operations (display processing) of the display system according to the seventh embodiment.
Figure 39:
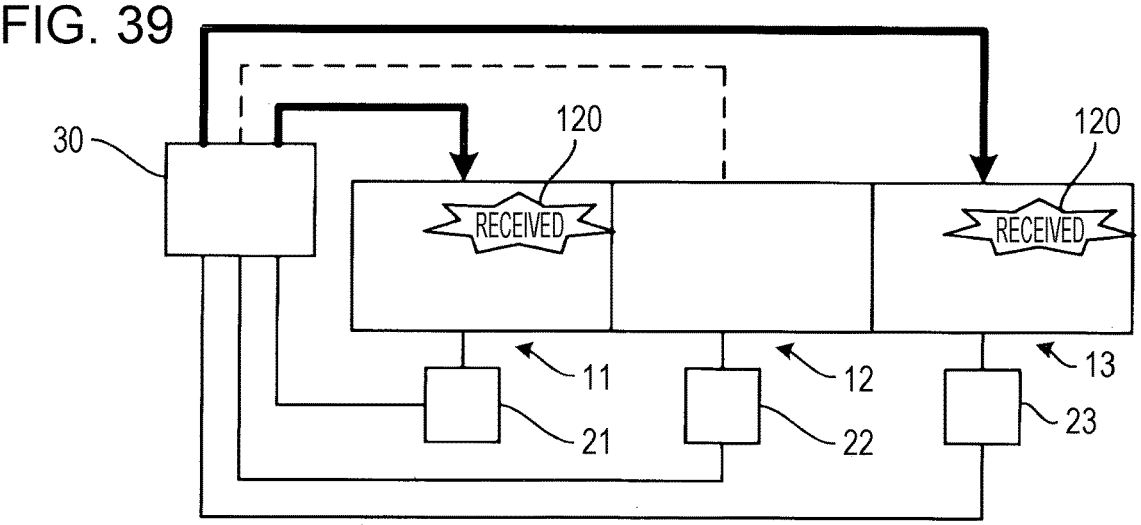
FIG. 39 is a diagram for describing operations (display processing) of the display system according to the seventh embodiment.

The control unit 32 (FIG. 24) of the control device 30 inputs or receives (step S1 in FIG. 4) image data P1 (content), as illustrated in FIG. 38. At this time, the control unit 32 (FIG. 24) saves the image data P1 in the folder 142 (FIG. 24). The notification control unit 131A (FIG. 24) displays notification information (message information 120) to the effect that the image data P1 has been input or received to the user 101 (FIG. 3), by displaying on the display devices 11 and 13 out of the multiple display devices 11 through 13, as illustrated in FIG. 39 (step S2 in FIG. 4).

Figure 40:
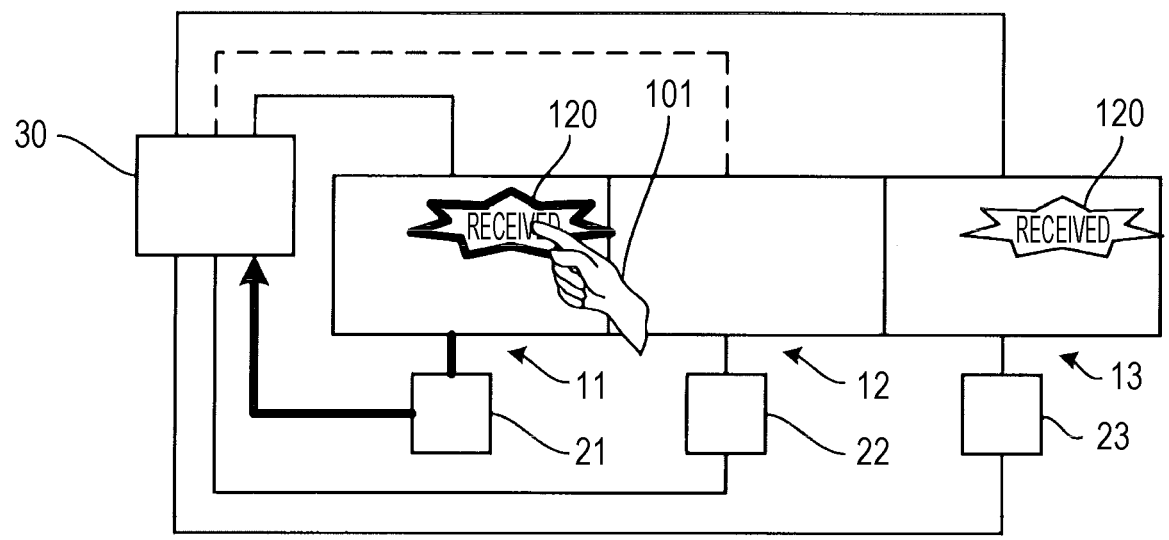
FIG. 40 is a diagram for describing operations (display processing) of the display system according to the seventh embodiment.

In a case where the user 101 has touched the display device 11 out of the multiple display devices 11 through 13 (Yes in step S3 in FIG. 4), the input detection device 21 out of the multiple input detection devices 21 through 23 detects the user touching the display device 11, as illustrated in FIG. 40. The device selecting unit 131 (FIG. 24) of the control device 30 selects, out of the multiple display devices 11 through 13, the display device 11 that the user 101 has touched (step S4 in FIG. 4).

Figure 41:
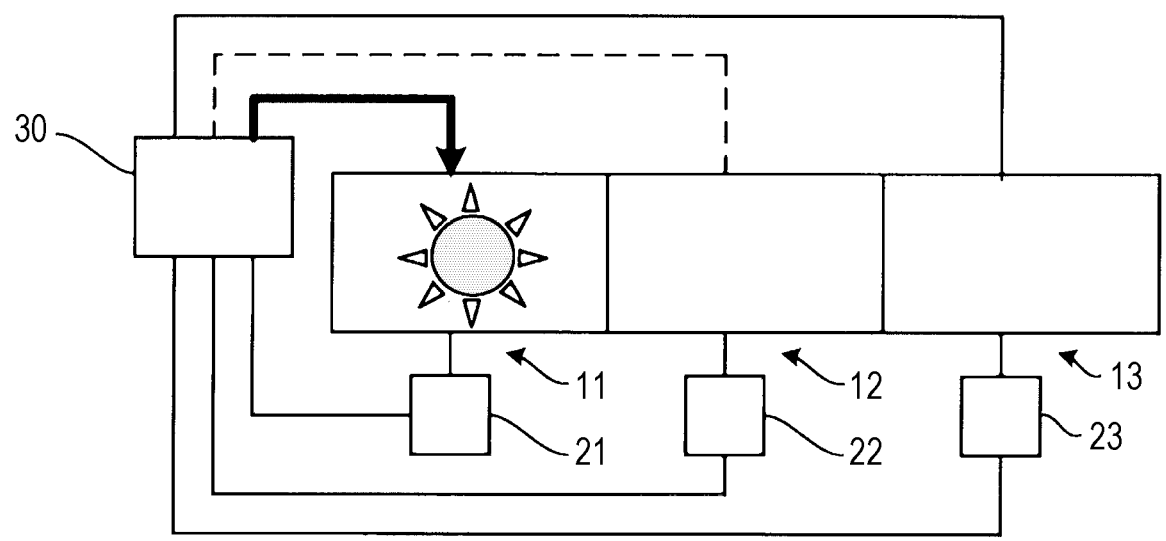
FIG. 41 is a diagram for describing operations (display processing) of the display system according to the seventh embodiment.

In a case where there is message information 120 existing at the position touched by the user 101 on the selected display device 11 (Yes in step S5 in FIG. 4), the display control unit 132 (FIG. 24) of the control device 30 confirms the size of the image data P1 as confirmation of the image data P1 (content) (step S6 in FIG. 4). The display control unit 132 (FIG. 24) displays the image data P1, in a displayable region of the selected display device 11 (step S7 in FIG. 4), as illustrated in FIG. 41.

As described above, in the display system according to the seventh embodiment, at least one display device 11 and 13 is selected by the device selecting unit 131 out of the multiple display devices 11 through 13 by specification of the user 101, and upon inputting or receiving image data P1, the notification control unit 131A notifies the user 101 by the specified display devices 11 and 13. Thus, in the display system according to the seventh embodiment, display or non-display of notification information (message information 120) can be specified regarding each of the multiple display devices 11 through 13.

Eighth Embodiment

Points that have been changed from the first through seventh embodiments will be described regarding a display system according to an eighth embodiment.

In the display system according to the first through seventh embodiments, a display devices for displaying image data are selected by the user 101 (teacher, presenter, etc.) touching at least one display device (e.g., in the case of the first embodiment, the display device 11) out of the multiple display devices 11 and 12.

Figure 42:
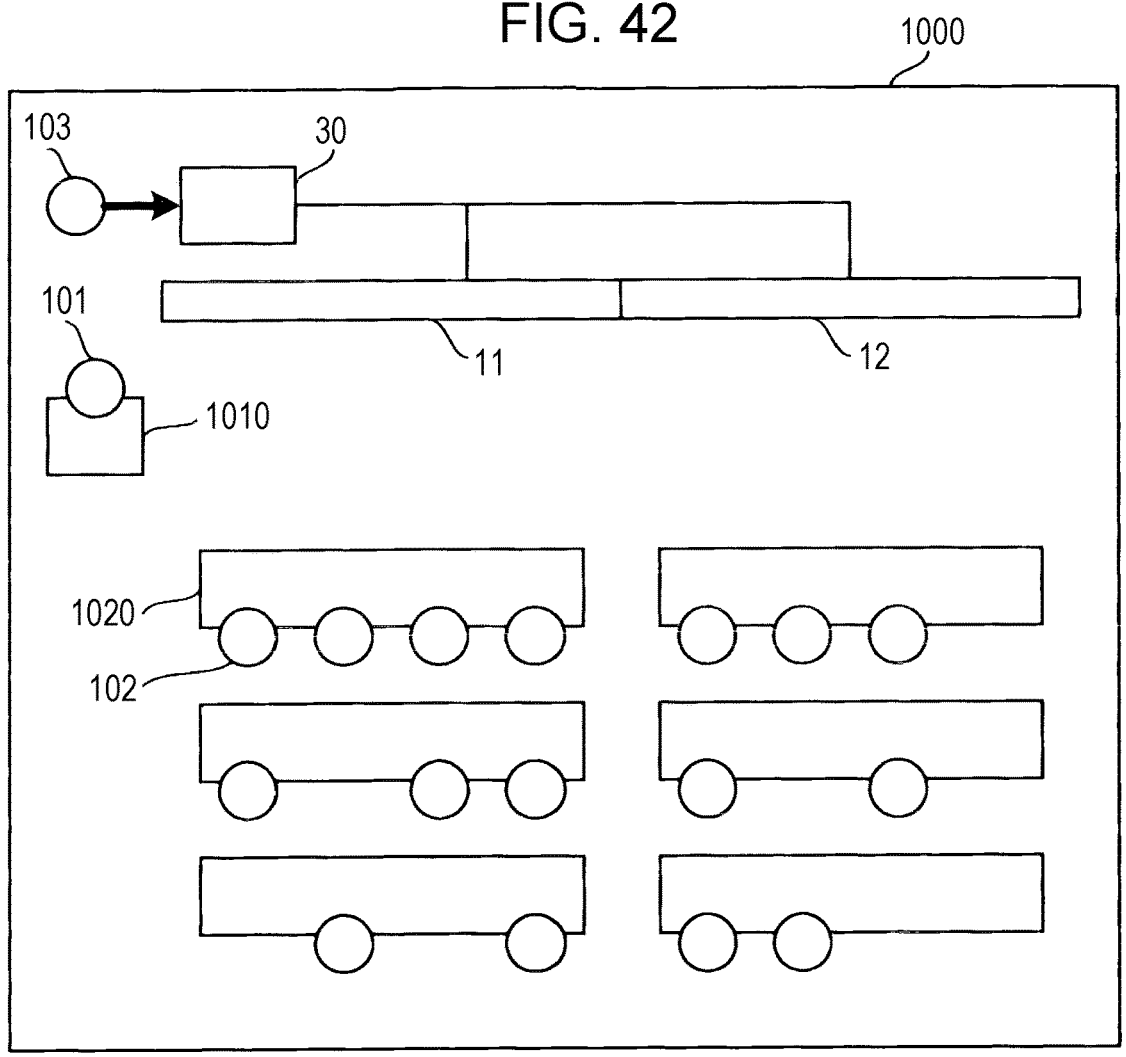
FIG. 42 is a diagram illustrating the layout of multiple display devices in the configuration of a display system according to an eighth embodiment.

On the other hand, in the display system according to the eighth embodiment, a user 103 (operator, etc.) other than the user 101 uses the control device 30 to specify at least one of the multiple display devices 11 and 12, thereby selecting display devices for displaying image data, as illustrated in FIG. 42.

Figure 43:
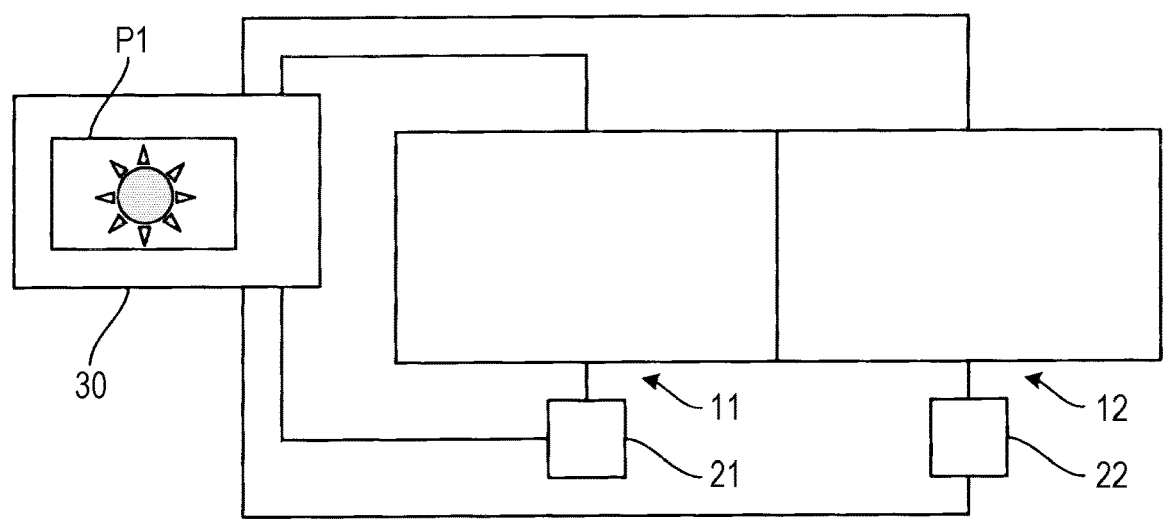
FIG. 43 is a diagram for describing operations (display processing) of the display system according to the eighth embodiment.
Figure 44:
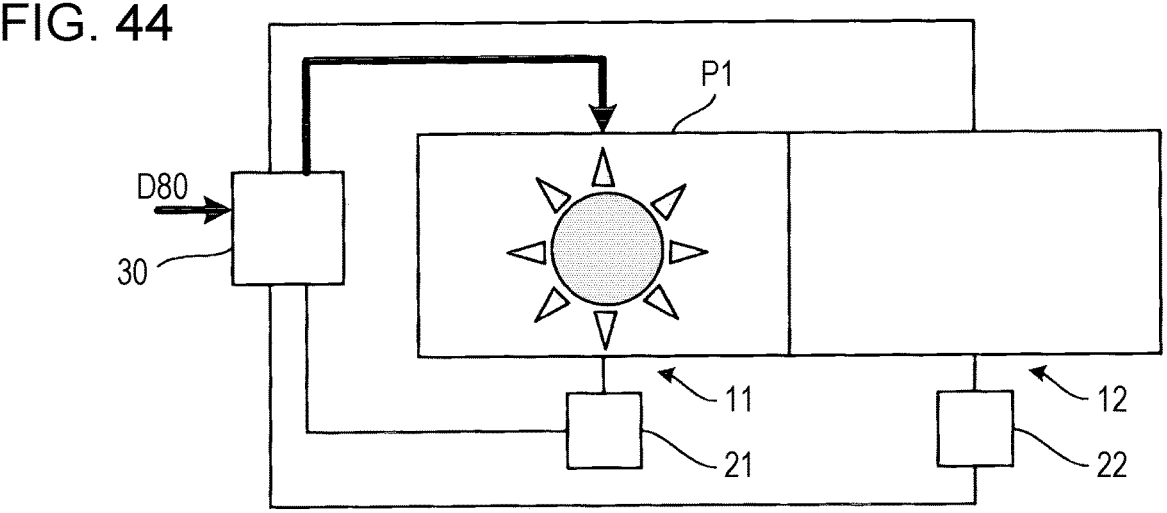
FIG. 44 is a diagram for describing operations (display processing) of the display system according to the eighth embodiment.

FIGS. 43 and 44 are diagrams for describing operations (display processing) of the display system according to the eighth embodiment.

Image data P1 is saved at the folder 142 (FIG. 1) in the control device 30, as illustrated in FIG. 43.

The user 103 (operator, etc.) gives specification information D80 to the control device 30 for specifying the display device 11 out of the multiple display devices 11 and 12, and the device selecting unit 131 (FIG. 1) selects the display device 11 out of the multiple display devices 11 and 12 based on the specification information D80, as illustrated in FIG. 44.

The display control unit 132 (FIG. 1) of the control device 30 confirms the size of the image data P1 as confirmation of the image data P1 (content). The display control unit 132 (FIG. 1) displays the image data P1 in a displayable region of the selected display device 11, as illustrated in FIG. 44.

As described above, the display system according to the eighth embodiment includes the multiple display devices 11 and 12, and the control device 30 connected to the multiple display devices 11 and 12. The control device 30 has the device selecting unit 131 that causes the user 103 (operator, etc.) to select at least one display device (the display device 11 in the case of the eighth embodiment) out of the multiple display devices 11 and 12, and the display control unit 132 that displays the image data P1 on the selected display device 11. Thus, in the display system according to the eighth embodiment, in a case of considering a multi-display where the multiple display devices 11 and 12 are arrayed, the user 103 selects the display device 11 before the image data P1 is displayed, thereby displaying the image data P1 on the display device 11 without displaying the image data P1 across the multiple display devices 11 and 12. Thus, according to the display system of the eighth embodiment, the image data P1 can be displayed at a position intended by the users 101 and 103 (the selected display device 11) so as to be more readily viewed by the user 101 (teacher, presenter, etc.) and audience 102 (students, participants, etc.) when displaying the image data P1 on the multiple display devices 11 and 12.

Note that in the display systems according to the first through eight embodiments, the multiple display devices 11 and 12 do not necessarily have to be laid out in an array, if display can be made at a position intended by the user, to facilitate viewing of image data.

Ninth Embodiment

Points that have been changed from the first through eighth embodiments will be described regarding a display system according to a ninth embodiment.

For example, in the first embodiment, a message "received", for example, has been described as being displayed as the message information 120. Description has also been made in the sixth embodiment regarding performing a preview display of image data that is the received content.

In the present embodiment, an embodiment will be described where an optional message is included in this message information and displayed. Specifically, a message to be notified is input at the control device 30. This input message is included in the message information as the notification message, and this notification message is displayed on the display devices.

Figure 45:
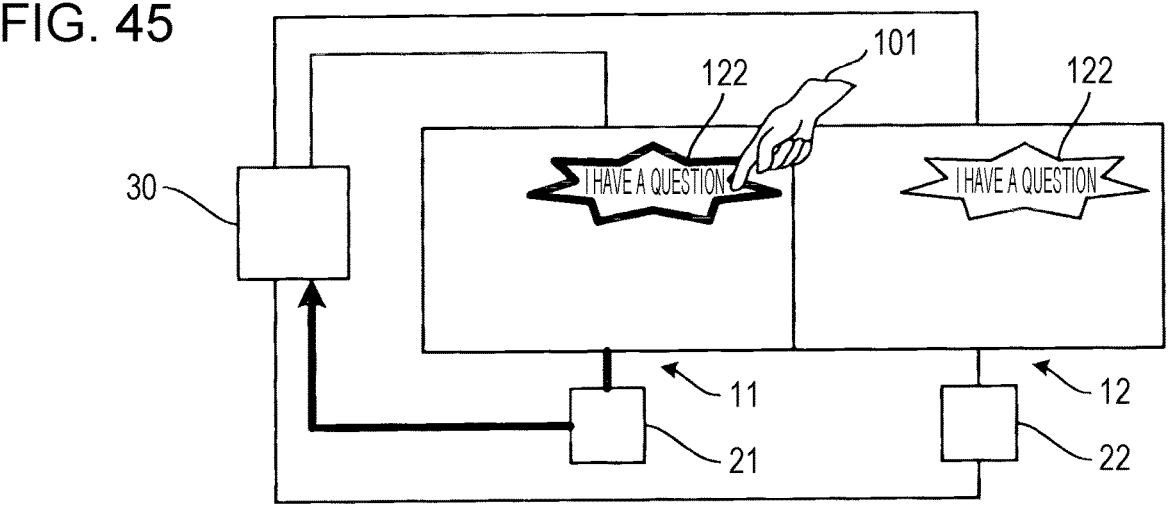
FIG. 45 is a diagram for describing operations (display processing) of a display system according to a ninth embodiment.

FIG. 45 is a diagram for describing the operations of the present embodiment. A case where "I have a question" has been input at the control device 30 will be described here.

The message input at the control device 30 is displayed as a notification message 122 at the display devices 11 and 12. Thus, the message to be displayed as a notification message can be optionally input.

Note that the display may be made in conjunction with the above-described embodiments, or selection may be made from multiple messages. Selection may be made available from the type of content being displayed on the display devices, or details received from an external device (e.g., mail or the like) may be displayed.

Also, selection may be made from multiple messages, without inputting a message. The user may make a selection at this time, or selection may be made in accordance with attributes of the received content. Accordingly, a notification message is displayed in accordance with the content.

For example, in a case where the content is an image or video, a predetermined image for "received" is displayed, or a thumbnail image is displayed, but if text, the text (or part of the text) may be displayed.

Note that in the case of external mail or the like, a message may be displayed in accordance with details of the mail. For example, a message may be displayed based on the body of the mail or messaging software, and a message may be selected and displayed in accordance with the sender.

Tenth Embodiment

Points that have been changed from the first through eighth embodiments will be described regarding a display system according to a tenth embodiment.

Figure 46:
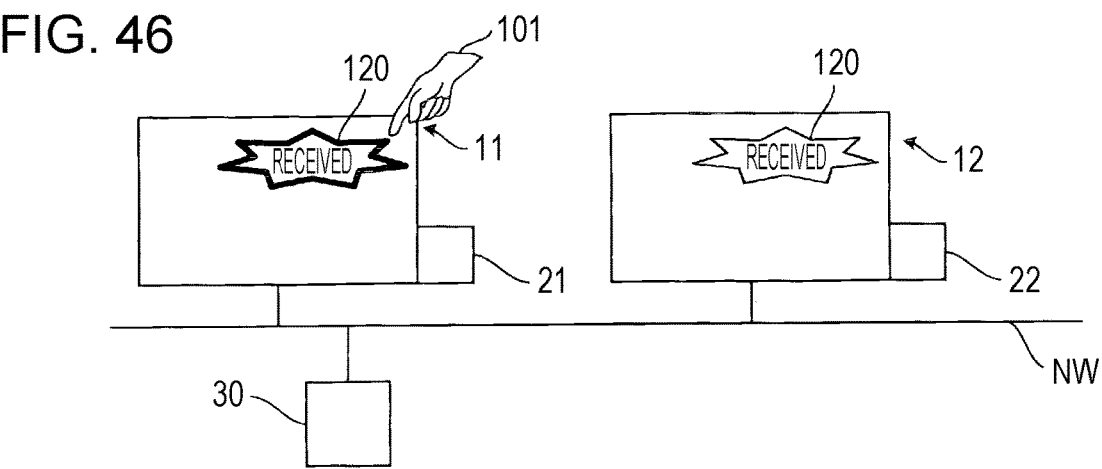
FIG. 46 is a diagram for describing operations (display processing) of a display system according to a tenth embodiment.

The display devices 11 and 12 are connected via a network NW in the tenth embodiment, as illustrated in FIG. 46. The control device 30 is also connected to the network NW. The network NW may be connected by an existing network (e.g., a cabled/wireless LAN), or may be a virtual network constructed on a network using LTE or WiMAX (registered trademark).

Display devices are identified by managing IP addresses and MAC addresses at the control device 30, for example. Processing the same as that in the above-described embodiments is executed regarding identified display devices.

Accordingly, in a case where the same screen is displayed in a large conference room for example, display can be made on display devices to which a presenter has moved, in accordance with the movement thereof.

MODIFICATIONS

As described above, the present invention is not restricted to the above-described embodiments, and various changes can be made. That is to say, embodiments obtained by combining technical means that have been changed as appropriate are also encompassed by the technical scope.

Although a configuration has been described in the above-described embodiments where a control device is provided separately from the display devices, the control device may be configured included in the display devices. For example, it will be self-evident to one skilled in the art that the same processing can be realized by setting one display device as a parent device and other display devices as child devices.

The control device may be realized by software at another device, and also can be realized by an external device. For example, it will be self-evident to one skilled in the art that the same processing can be realized by installing an application in a smartphone or tablet terminal and executing.

Although the sequence diagram of FIG. 47 has been referenced in the description of the first embodiment and fourth embodiment, besides the flowchart of FIG. 4, it goes without saying that the same processing can be described with other embodiments as well. That is to say, FIG. 47 is a diagram clarifying the configurations of the devices, and is an example of description for realizing the invention of the present embodiment.

REFERENCE SIGNS LIST

11 display device
12 display device
13 display device
21 input detection device
22 input detection device
23 input detection device
30 control device
31 storage unit
32 control unit
101 user (teacher, presenter)
102 audience (student, participant)
103 user (operator)
110 display method selection screen
111 display pattern selection space
112 display pattern selection space
113 display pattern selection space
114 display pattern selection space
115 display pattern selection space
120 message information
131 device selecting unit
131A notification control unit
132 display control unit
133 page operation control unit
141 table
142 folder
500 speaker
620 preview display information
1000 room (classroom)
1010 desk (for teacher)
1020 desk (for students)
D71 specification information
D72 non-specification information
D80 specification information
P1 image data P2 image data
P3 image data

The invention claimed is:

1. A display control device capable of communication with a plurality of adjoiningly arranged display devices so as to display a content, the display control device comprising:
a memory that stores instructions; and
a processor that executes the instructions stored in the memory to:
upon input or reception of the content, perform control of displaying notification information making notification to that effect on the adjoiningly arranged display devices;
receive a content display selection signal from one of the adjoiningly arranged display devices; and
in a case of having received the content display selection signal, effect control to display the content that is inputted or received on the one of the adjoiningly arranged display devices that has transmitted the content display selection signal.

2. The display control device according to claim 1, wherein the notification information includes message information for notifying that the content has been input or received, by a message.

3. The display control device according to claim 1, wherein the notification information is preview display information notifying that the content has been input or received by performing a preview display of the content.

4. The display control device according to claim 1, wherein, when the content has been input or received, illuminate notification on display screens of the adjoiningly arranged display devices are performed.

5. The display control device according to claim 1, wherein, when the content has been input or received, sound notification by speakers of the adjoiningly arranged display devices are performed.

6. The display control device according to claim 1, wherein, when the content that is inputted or received is displayed on the one of the adjoiningly arranged display devices that has transmitted the content display selection signal, control is effected to display the content so as to fit in a display area of the one of the adjoiningly arranged display devices.

7. A display system, comprising: a plurality of adjoiningly arranged display devices capable of displaying a content; and a display control device capable of communication with the adjoiningly arranged display devices,
wherein the display control device includes
a memory that stores instructions; and
a processor that executes the instructions stored in the memory to:
upon input or reception of the content, transmit notification information used at the adjoiningly arranged display devices to make notification to that effect, to the adjoiningly arranged display devices,
wherein each of the adjoiningly arranged display devices includes
a display unit displays notification information received from the display control device,
the display transmitting, in a case of a user having selected the displayed notification information, a content display selection signal to the display control device, and
wherein the processor of the display control device further executes the instructions to:
in a case of having received the content display selection signal from one of the adjoiningly arranged display devices, transmit the content to the one of the display device.

8. The display system according to claim 7, wherein, in a case of receiving a content display selection signal from one of the adjoiningly arranged display devices, and thereafter receiving a content display selection signal from an other one of the adjoiningly arranged display devices within a predetermined time, the content is transmitted to both of the one and the other one of adjoiningly arranged display devices.

9. A display control method in a display control device capable of communication with a plurality of adjoiningly arranged display devices capable of displaying a content, the method comprising:
a notification information display control step where, upon input or reception of the content, control is effected to display notification information making notification to that effect on the adjoiningly arranged display devices;
a content display selection signal reception step of receiving a content display selection signal from one of the adjoiningly arranged display devices; and
a content display control step where, in a case of having received the content display selection signal, control is effected to display the content that is inputted or received on the one of the display devices that has transmitted the content display selection signal.

* * * * *